United States Patent
Krishnaswamy et al.

(10) Patent No.: US 9,455,897 B2
(45) Date of Patent: Sep. 27, 2016

(54) COOPERATIVE BANDWIDTH AGGREGATION USING MULTIPATH TRANSPORT

(75) Inventors: Dilip Krishnaswamy, San Diego, CA (US); Samir S. Soliman, San Diego, CA (US); Srinivasa R. Eravelli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 361 days.

(21) Appl. No.: 12/957,801

(22) Filed: Dec. 1, 2010

(65) Prior Publication Data

US 2011/0296006 A1    Dec. 1, 2011

Related U.S. Application Data

(60) Provisional application No. 61/321,201, filed on Apr. 6, 2010.

(51) Int. Cl.
| | |
|---|---|
| *G06F 15/173* | (2006.01) |
| *H04L 12/701* | (2013.01) |
| *H04L 12/707* | (2013.01) |
| *H04L 29/08* | (2006.01) |
| *H04L 29/06* | (2006.01) |
| *H04L 29/12* | (2006.01) |
| *H04W 8/26* | (2009.01) |
| *H04W 28/06* | (2009.01) |
| *H04W 72/00* | (2009.01) |
| *H04W 92/18* | (2009.01) |

(52) U.S. Cl.
CPC ......... *H04L 45/00* (2013.01); *H04L 29/12952* (2013.01); *H04L 45/24* (2013.01); *H04L 61/6077* (2013.01); *H04L 67/04* (2013.01); *H04L 69/14* (2013.01); *H04L 69/165* (2013.01); *H04L 29/12216* (2013.01); *H04L 61/2007* (2013.01); *H04W 8/26* (2013.01); *H04W 28/06* (2013.01); *H04W 72/00* (2013.01); *H04W 92/18* (2013.01); *Y02B 60/33* (2013.01)

(58) Field of Classification Search
CPC . H04L 45/24; H04L 41/0896; G06F 15/173; G06F 11/0709
USPC ......... 709/224, 227, 232; 370/217, 252, 389
See application file for complete search history.

(56) References Cited

U.S. PATENT DOCUMENTS

| | | |
|---|---|---|
| 6,178,448 B1 | 1/2001 | Gray et al. |
| 7,339,897 B2 | 3/2008 | Larsson et al. |

(Continued)

FOREIGN PATENT DOCUMENTS

| | | |
|---|---|---|
| EP | 1786151 A2 | 5/2007 |
| EP | 1786151 A2 * | 5/2007 |

(Continued)

OTHER PUBLICATIONS

Ford, et al., "Architectural Guidelines for Multipath TCP Development draft-ietf-mptcp-architecture-00", Internet-Draft, MPTCP Architecture, Feb. 2010, pp. 1-25.

(Continued)

*Primary Examiner* — Hitesh Patel
(74) *Attorney, Agent, or Firm* — Charles E. Eggers

(57) ABSTRACT

A method of wireless communication includes communicating with a server through a first MPTP path using a first IP address; communicating with the server through a second MPTP path using a second IP address, the communication with the server through the second MPTP path being through a wireless node at the second IP address; and communicating with the wireless node through peer-to-peer communication.

25 Claims, 21 Drawing Sheets

(56) References Cited

U.S. PATENT DOCUMENTS

| | | |
|---|---|---|
| 7,349,380 B2 | 3/2008 | Barker et al. |
| 7,359,971 B2 | 4/2008 | Jorgensen |
| 7,376,087 B2 | 5/2008 | Srikrishna |
| 7,561,517 B2 | 7/2009 | Klinker et al. |
| 7,643,427 B2 | 1/2010 | Kokku et al. |
| 7,796,503 B2 | 9/2010 | Hamada et al. |
| 2002/0080755 A1 | 6/2002 | Tasman et al. |
| 2002/0083172 A1 | 6/2002 | Knowles et al. |
| 2006/0098611 A1 | 5/2006 | Joshi et al. |
| 2006/0105764 A1 | 5/2006 | Krishnaswamy et al. |
| 2006/0193295 A1 | 8/2006 | White et al. |
| 2007/0005787 A1* | 1/2007 | Igarashi et al. ............ 709/230 |
| 2007/0087829 A1 | 4/2007 | Liu et al. |
| 2007/0094325 A1 | 4/2007 | Ih et al. |
| 2007/0109990 A1* | 5/2007 | Bennett .................... 370/328 |
| 2007/0211720 A1 | 9/2007 | Fuchs et al. |
| 2007/0291765 A1 | 12/2007 | Boley et al. |
| 2008/0108437 A1 | 5/2008 | Kaarela et al. |
| 2008/0133767 A1 | 6/2008 | Birrer et al. |
| 2008/0247355 A1 | 10/2008 | Ahn |
| 2008/0268904 A1 | 10/2008 | Tanaka |
| 2008/0298303 A1 | 12/2008 | Tsirtsis |
| 2009/0201813 A1 | 8/2009 | Speight |
| 2009/0252200 A1 | 10/2009 | Dohler et al. |
| 2009/0253417 A1 | 10/2009 | Soma et al. |
| 2009/0325479 A1 | 12/2009 | Chakrabarti et al. |
| 2010/0020753 A1 | 1/2010 | Fulknier et al. |
| 2010/0074119 A1 | 3/2010 | Krishnaswamy |
| 2010/0135266 A1* | 6/2010 | Karaoguz et al. ........... 370/338 |
| 2010/0150161 A1* | 6/2010 | Saksena et al. ............ 370/400 |
| 2010/0315973 A1 | 12/2010 | Hirano et al. |
| 2010/0329248 A1* | 12/2010 | Eggert et al. .............. 370/389 |
| 2011/0055901 A1 | 3/2011 | Karaoguz et al. |
| 2011/0149739 A1* | 6/2011 | Sarkar ..................... 370/235 |
| 2011/0235578 A1* | 9/2011 | Laganier et al. ........... 370/328 |
| 2011/0252151 A1* | 10/2011 | Lu et al. ................... 709/228 |
| 2012/0020248 A1 | 1/2012 | Granlund et al. |
| 2012/0236801 A1 | 9/2012 | Krishnaswamy et al. |
| 2012/0243441 A1 | 9/2012 | Reunamaki et al. |
| 2012/0320752 A1 | 12/2012 | Gouache et al. |
| 2012/0321008 A1 | 12/2012 | Krishnaswamy et al. |
| 2012/0331160 A1 | 12/2012 | Tremblay et al. |
| 2013/0031256 A1 | 1/2013 | Hampel |
| 2013/0077501 A1 | 3/2013 | Krishnaswamy et al. |
| 2015/0282219 A1* | 10/2015 | Kweon ............... H04W 76/02 370/235 |
| 2016/0212755 A1* | 7/2016 | Cao ................... H04W 72/087 |

FOREIGN PATENT DOCUMENTS

| | | | |
|---|---|---|---|
| EP | 2040390 A1 | | 3/2009 |
| EP | 2495927 A1 | * | 9/2012 |
| JP | 2007043678 A | | 2/2007 |
| JP | 2008278197 A | | 11/2008 |
| JP | 2009253752 A | | 10/2009 |
| JP | 2009296084 A | | 12/2009 |
| JP | 2010504047 A | | 2/2010 |
| WO | WO2005011173 A2 | | 2/2005 |
| WO | WO-2008078633 A1 | | 7/2008 |
| WO | 2010008615 A1 | | 1/2010 |
| WO | WO2010027858 A2 | | 3/2010 |
| WO | WO-2011041798 | | 4/2011 |
| WO | WO-2011073495 A1 | | 6/2011 |

OTHER PUBLICATIONS

Hasegawa Y et al.,"Improved data distribution for multipath TCP communication", IEEE Globecom, 2005, pp. 271-275.

Rojviboonchai K. et al., "An Evaluation of Multi-path Transmission Control Protocol (M/TCP) with Robust Acknowledgement Schemes", IEICE Trans Commun, 2004, pp. 2699-2707, vol. E87-B; No. 9.

David G. et al., "Best-Path vs. Multi-Path Overlay Routing", Proc. ACM SIGCOMM Internet Measurement Conference, 2003, pp. 91-100.

Jardine, et al., "A hybrid architecture for massively multiplayer online games" Proceedings of the 7th ACM SIGCOMM Workshop on Network and System Support for Games, 2008, pp. 60-65.

Han H., et al., "Multi-Path TCP: A Joint Congestion Control and Routing Scheme to Exploit Path Diversity in the Internet", IEEE/ACM Transactions on Networking, IEEE/ACM, New York, NY, US, vol. 14, No. 6, Dec. 1, 2006, pp. 1260-1271, XP011151888, ISSN: 1063-6692, DOI: 10.1109/TNET.2006.886738 p. 1262, left-hand column, line 19-line 32.

Huszak A., et al., "Content-aware interface selection method for multi-path video streaming in best-effort networks", Telecommunications, 2009. ICT '09. International Conference on, IEEE, Piscataway, NJ, USA, May 25, 2009, pp. 196-201, XP031485724, ISBN: 978-1-4244-2936-3 p. 197, left-hand column, line 7—p. 198, col. 18, line 21.

International Search Report and Written Opinion—PCT/US2011/031442—ISA/EPO—Apr. 11, 2012.

Li Y., et al., "SmartTunnel: A Multipath Approach to Achieving Reliability in the Internet", Department of Computer Sciences, University of Texas at Austin Internet Article, Jul. 31, 2006, pp. 1-13, XP002672146, Austin Retrieved from the Internet: URL:http://www.es.utexas.edu/ftp/pub/techreports/tr06-38.pdf [retrieved on Mar. 21, 2012] p. 2, right-hand column, line 12-line 34; figure 1 p. 11, left-hand column, line 4-line 14 p. 3.

Partial International Search Report—PCT/US2011/031442—ISA/EPO—Jan. 20, 2012.

Sheriff I., et al., "Multipath Selection in Multi-radio Mesh Networks", Broadband Communications, Networks Systems, 2006. Broadnets 2006. 3rd International Conference on, IEEE, Piscataway, NJ, USA, Oct. 1, 2006, pp. 1-11, XP031155972, ISBN: 978-1-4244-0424-7.

Feilner,"OpenVPN 101: introduction to OpenVPN", Telindus High-Tech Institute, Stijn Huyghe, Packt Publishing, Apr. 2006 25 pages.

Ford, "TCP Extensions for Multipath Operation with Multiple Addresses draft-ford-mptcp-multiaddressed-03", Internet Engineering Task Force, Mar. 8, 2010, University College London, 33 pages.

Stewart, "Stream Control Transmission Protocol", Network Working Group, Sep. 2007, 153 pages.

Agrawal, P., et al., "MTorrent: A multicast enabled BitTorrent protocol", Communication Systems and Networks (C0MSNETS), 2010 Second International Conference on, IEEE, Piscataway, NJ, USA, Jan. 5, 2010 ', pp. 1-10, XP031670909, ISBN: 978-1-4244-5487-7.

Stoica, I., et al., "Internet Indirection Infrastructure" IEEE / ACM Transactions on Networking, IEEE / ACM, New York, NY, US, vol. 12, No. 2, Apr. 1, 2004 pp. 205-218, XP001193285, ISSN: 1063-6692, DOI: 10.1109/TNET.2004.826279.

Warabino, T., et al., "Overhead Reduction of Internet Indirection Infrastructure (13) for Future Mobile and Wireless Communications", IEICE Transactions on Communications, Communications Society, Tokyo, JP, vol. E90B, No. 4, Apr. 1, 2007', pp. 761-768, XP001541830, ISSN: 0916-8516, DOI: 10.1093/IETC0M/E90-B. 4.761.

Andersen, D., et al., "Resilient Overlay Networks", MIT Laboratory for Computer Science, 2001, ACM SIGOPS Operating Systems Review Homepage, vol. 35 Issue 5, Dec. 2001, pp. 131-145, ron@nms.Ics.mit.edu.

Hsieh, H.Y., et al., "A Transport Layer Approach for Achieving Aggregate Bandwidths on Multi-homed Mobile Hosts", School of Electrical and Computer Engineering Georgia Institute of Technology, Atlanta, GA 30332, USA, MOBICOM'02, Sep. 23-28, 2002, Atlanta, Georgia, USA, pp. 83 to pp. 94, {hyhsieh, siva}@ece.gatech.edu.

Savage, S., et al., "The End-to-End Effects of Internet Path Selection", Department of Computer Science and Engineering University of Washington, Seattle, SIGCOMM '1999 8199 Cambridge, MA, USA ACM SIGCOMM Computer Communication Review Homepage, vol. 29 Issue 4, Oct. 1999, pp. 289-299.

Scharf M et al., "MCTCP: A Multipath Transport Shim Layer", Global Telecommunications Conference (GLOBECOM 2011), 2011 IEEE, IEEE, Dec. 5, 2011, pp. 1-5, XP032119220, DOI: 10.1109/GL0C0M.2011.6134021 ISBN: 978-1-4244-9266-4.

(56) References Cited

OTHER PUBLICATIONS

Wischik D, et al., "Design, implementation and evaluation of congestion control for multipath TCP", proceedings of Usen.ix NSDI, 2011,, Apr. 1, 2011, XP055045890, Boston, USA Retrieved from the Internet: URL:http://static.usenix.org/event/nsdi11/ tech/ full_papers/Wischi k.pdf [retrieved on Nov. 28, 2012].

Zhang M., et al.,"A Transport Layer Approach for Improving End-to-End Performance and Robustness Using Redundant Paths", Proceeding ATEC '04 Proceedings of the annual conference on USENIX Annual Technical Conference, USENIX Association Berkeley, CA, USA 2004 , table of contents, 2004, pp. 1-14.

Baccelli, F., et al., "The one-to-many TCP overlay: a scalable and reliable multicast architecture", INFOCOM 2005, 24th Annual Joint Conference of the IEEE Computer and Communications Societies, Proceedings IEEE, vol. 3, No., pp. 1629, 1640 vol. 3, Mar. 13-17, 2005.

Mathis M., et al., "TCP Selective Acknowledgment Options", Oct. 1996, 12 pages.

Ford A., et al., "Architecture guideline for multipath TCP Development", Internet Engineering Task Force (IETF), Request for Comments: 6182, Mar. 2011, pp. 1/28, ISSN: 2070-1721, URL, http://tools.ietf.org/pdf/rfc6182.pdf.

Tonouchi M., "A Study on retransmission control of multipath-extended TCP", IPSJ SIG Technical Reports, vol. 2004, No. 21, Japan, Information Processing Society of Japan, Mar. 5, 2004.

Tonouchi M., "Design of Dynamic Multi Link TCP for Mobile Communication", Proceedings of Multimedia, Distributed, Cooperative and Mobile (DICOMO) Symposium, 1997-2006 Ver.1.1 [DVD-ROM], Japan, The Information Processing Society of Japan, vol. 2003, Jun. 2003.

\* cited by examiner

COOPERATIVE BANDWIDTH AGGREGATION USING MULTIPATH TRANSPORT

CROSS-REFERENCE TO RELATED APPLICATION(S)

The present application claims the benefit of U.S. Provisional Patent Application No. 61/321,201, entitled "COOPERATIVE BANDWIDTH AGGREGATION USING MULTIPATH TRANSPORT," filed on Apr. 6, 2010, which is expressly incorporated by reference herein in its entirety.

BACKGROUND

1. Field

The following description relates generally to wireless communications and, more particularly, to a method for cooperative bandwidth aggregation using a MultiPath Transport Protocol.

2. Background

A MultiPath Transport Protocol (MPTP) allows support for multiple subflows or streams to be managed at the transport layer between a source and a destination on the internet. Examples of a MPTP include the MultiPath Transmission Control Protocol (TCP) and the Stream Control Transmission Protocol (SCTP). In particular, MultiPath Transmission Control Protocol (MPTCP) has been suggested to utilize multiple paths on the Internet between a source and a destination to aggregate performance across the paths. MultiPath TCP requires both the source and destination nodes to implement a MultiPath TCP compliant software stack. Many application servers on the Internet may have a legacy TCP stack. While a Client's TCP stack could be modified to be MultiPath TCP compliant, an application server may not have MultiPath TCP capability.

Wireless Wide Area Network (WWAN) Client nodes may be able to utilize multiple wireless carriers simultaneously. WWAN Client nodes can have multiple modems to access different wireless carriers with protocol stacks supporting the same wireless technology or different wireless technologies across the carriers. However, when using multiple carriers, the differential bandwidth across carriers and the inter-carrier skew between the carriers can be significant. Such an inter-carrier skew can vary typically over a range from 20 ms to 200 ms. The skew varies depending on where the traffic gets split in the WWAN infrastructure. For example, if the traffic across carriers gets split at an eNodeB where such an eNodeB serves multiple carriers both supporting Long Term Evolution (LTE), because the skew is local, the variation in the skew may be small. It is possible that tunneling may be required between eNodeBs in LTE for one or more paths, which can increase the skew across the paths. The differential bandwidth across paths can vary on the order of several tens to hundreds of kbps typically across multiple WWAN paths. Additionally, for example, if the traffic gets split at a Radio Network Controller (RNC) that serves different NodeBs in a WCDMA/UMTS/LTE network, or that serves different BTSs in a CDMA2000 network, each of which supports a different carrier for Wideband Code Division Multiple Access (W-CDMA)/UMTS or High Speed Packet Access (HSPA), then there can be additional variation in the differential bandwidth and skew across the paths can occur. Furthermore, the traffic may be split between RNCs and/or eNodeBs at a node higher up in the infrastructure that eventually serves the RNCs and/or eNodeBs and/or BNCs.

The differential bandwidth and skew across the paths can affect TCP performance when a single application flow for a WWAN Client utilizes multiple carriers. In such cases, MultiPath TCP would be useful to optimize the skew. However, an application server on the Internet for the other end-point of the TCP connection may not be MultiPath TCP compliant.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication includes communicating with a server through a first MPTP path using a first IP address, communicating with the server through a second MPTP path using a second IP address, the communication with the server through the second MPTP path being through a wireless node at the second IP address; and communicating with the wireless node through peer-to-peer communication.

In an aspect of the disclosure, a method of wireless communication includes requesting an MPTP session with an MPTP tunneling server. In addition, the method includes communicating with the MPTP tunneling server through an MPTP tunnel, the tunnel comprising one or more MPTP paths, each of the MPTP paths corresponding to a carrier for communication.

In an aspect of the disclosure, a method of wireless communication includes selecting one or more MPTP paths based on one or more performance parameters and one or more path parameters, and establishing a link using the selected one or more MPTP paths.

Yet another aspect relates to an apparatus. The apparatus can include means for communicating with a server through a first MPTP path using a first IP address, means for communicating with the server through a second MPTP path using a second IP address, the communication with the server through the second MPTP path being through a wireless node at the second IP address, and means for communicating with the wireless node through peer-to-peer communication.

Still another aspect relates to another apparatus. The apparatus can include means for requesting an MPTP session with an MPTP tunneling server. In addition, the apparatus includes means for communicating with the MPTP tunneling server through an MPTP tunnel, the tunnel comprising one or more MPTP paths, each of the MPTP paths corresponding to a carrier for communication Yet another aspect relates to an apparatus. The apparatus can include means for selecting one or more MPTP paths based on one or more performance parameters and one or more path parameters, and means for establishing a link using the selected one or more MPTP paths.

Still another aspect relates to a computer program product comprising a computer-readable medium. The computer-readable medium can include code for communicating with a server through a first MPTP path using a first IP address; communicating with the server through a second MPTP path using a second IP address, the communication with the server through the second MPTP path being through a wireless node at the second IP address; and communicating with the wireless node through peer-to-peer communication.

Still another aspect relates to a computer program product comprising a computer-readable medium. The computer-readable medium can include code for requesting an MPTP session with an MPTP tunneling server, and communicating with the MPTP tunneling server through an MPTP tunnel, the tunnel comprising one or more MPTP paths, each of the MPTP paths corresponding to a carrier for communication.

Still another aspect relates to a computer program product comprising a computer-readable medium. The computer-readable medium can include code for selecting one or more MPTP paths based on one or more performance parameters and one or more path parameters, and establishing a link using the selected one or more MPTP paths.

Another aspect relates to an apparatus for wireless communications. The apparatus may also include a processing system configured to communicate with a server through a first MPTP path using a first Internet Protocol (IP) address, communicate with the server through a second MPTP path using a second IP address, the communication with the server through the second MPTP path being through a wireless node at the second IP address, and communicate with the wireless node through peer-to-peer communication.

Another aspect relates to an apparatus for wireless communications. The apparatus may also include a processing system configured to request an MPTP session with an MPTP tunneling server, and communicate with the MPTP tunneling server through an MPTP tunnel, the tunnel comprising one or more MPTP paths, each of the MPTP paths corresponding to a carrier for communication.

Another aspect relates to an apparatus for wireless communications. The apparatus may also include a processing system configured to select one or more MPTP paths based on one or more performance parameters and one or more path parameters, and establish a link using the selected one or more MPTP paths.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
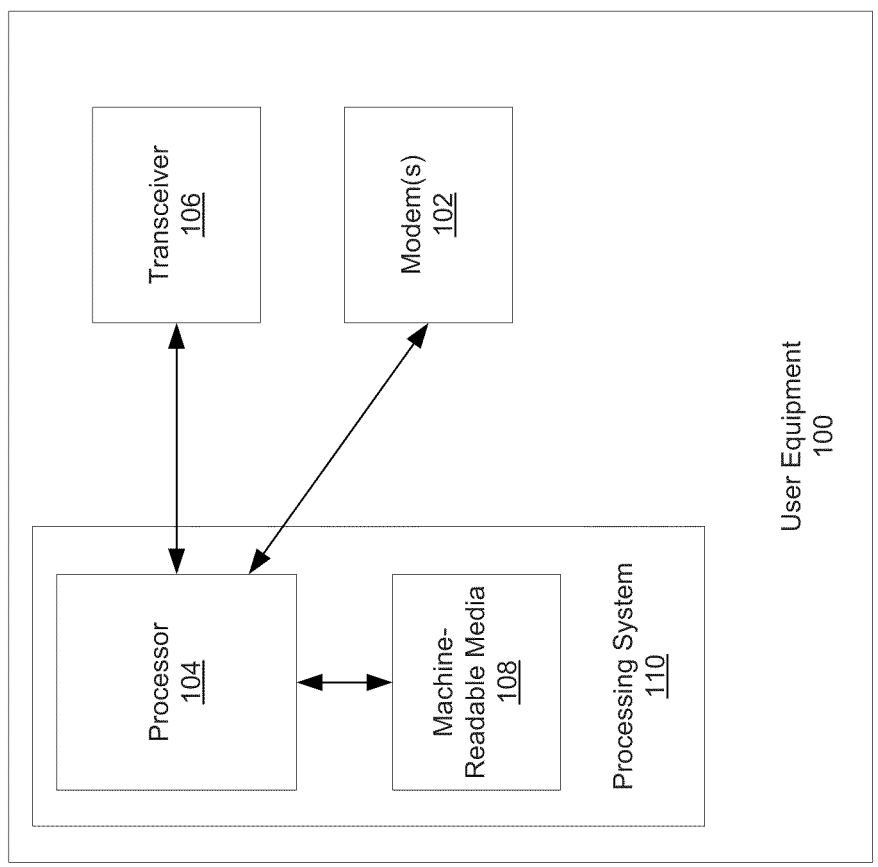
FIG. 1 is a block diagram illustrating a hardware configuration for an exemplary apparatus.

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Examples of apparatuses suitable for incorporating various aspects of the invention include, but are not limited to, a user equipment (UE) capable of operating in a wireless network, a WWAN client, etc. A UE may be referred to as a wireless terminal, a mobile phone, a user terminal, a mobile station, a mobile device, a subscriber station, a wireless device, a wireless node, a terminal, an access terminal, a node, a handheld device, or some other suitable terminology. The various concepts described throughout this disclosure are intended to apply to all suitable apparatuses regardless of their specific nomenclature.

Generally, in one aspect, concurrent bandwidth aggregation across cooperating WWAN modems may occur, where these cooperating modems can reside on one mobile platform or on multiple mobile platforms that are within wired or wireless proximity of each other. Examples of WWAN technologies may include but are not limited to: LTE (Long Term Evolution), High Speed Packet Access (HSPA) and its evolutions, CDMA2000-DORevA/B, Worldwide Interoperability for Microwave Access (WiMAX), UMTS, GPRS/EDGE, Whitespace-based WWANs. Each of the WWAN modems can access a WWAN network, so that mobile platform can aggregate bandwidth using each of the WWAN modems available to it. The available modems associated with the user may reside on one device. Additional modems may be present on multiple devices that may dynamically associate when the devices come within wired or wireless proximity of each other. Further, such multiple devices may coordinate together over wired or wireless links (e.g., traffic merging or splitting can be performed on one of the devices). In one aspect, available modems can coordinate with each other to exchange information regarding the availability and performance and pricing of WWAN technologies and link conditions, etc., and then select appropriate WWANs to use. The available performance in a WWAN may vary based on the number of users in the network. In general, a WWAN can have a cell spectral efficiency of $\lambda$, where $\lambda$ may vary from 0.8 to 1.65 bps/Hz. Congestion on the network due to signaling can reduce spectral efficiency. Further, if we let that reduction be specified by a fraction $\eta$ that we will call as the "twitter inefficiency factor." It is possible that $\eta$ can be 0.4 or 40% in loaded networks. Then the effective dynamically available spectral efficiency in the system for true data transmissions is given by $\eta\lambda$. Further, if one assumes a channel bandwidth of W, and the number of active data users N, the average available performance for an active data user in the network is given by $\eta\lambda W/N$. It may be noted that $\eta$ is not a constant, but varies as a function of the number of connected users in the system M, where M is expected to be much larger than N. If each connected user utilizes effectively $\delta$ bps in the system (note that $\delta$ is not bandwidth but the effective load in terms of time lost in the system due to congestion), then M connected users utilize $M\delta$ bps of resources effectively. The total available spectral performance is $\lambda W$. Therefore in one aspect, $\eta$ is given by $\eta=(1-M\ \delta/\lambda W)$. In one example, for a system with $\lambda=1$ bps/Hz, W=5 MHz, $\delta$=25 kbps, and M=100, then $\eta$=0.5, a WWAN S may have a state determined by a quintuple ($\eta$, $\lambda$, W, N, M). Assuming all other factors are fixed, the average user throughput in the WWAN drops as (1/N) (e.g., drops as the reciprocal of the number of active data users in the WWAN), and is given by $T_u$ (S)=$\eta\lambda W/N$. Here $\lambda$ is the average spectral efficiency of the WWAN system assuming full resource availability, including codes, time slots, and power management. When the number of users is low, features such as code multiplexing gain or multi-user diversity gain may not be fully utilized. However, as the number of users increase with users randomly distributed in a cell/sector, then the spectral efficiency in the system may converge to an average expected value in the system.

In another example, consider two WWANs $S_1$ and $S_2$, with states ($\eta_1$, $\lambda_1$, $W_1$, $N_1$, $M_1$) and ($\eta_2$, $\lambda_2$, $W_2$, $N_2$, $M_2$) respectively. Based on the above discussed equations, the expected average user throughput $T_u$ ($S_1$, $S_2$) for a user when using data paths from the two WWANs is given by $T_u$ ($S_1$, $S_2$)=$\eta_1\lambda_1 W_1/N_1+\eta_2\lambda_2 W_2/N_2$. For k WWANs $S_1, S_2, \ldots S_K$, the aggregated bandwidth is given by, $T_u$ ($S_1, S_2, \ldots S_K$)=$\Sigma\eta_i\lambda_i W_i/N_i$. A mobile platform can thus obtain higher throughput using different networks/channels. Higher throughput may also possible when using two WWAN modems on the same channel. In such an aspect, a user may turn on two WWAN modems with the same base-station. Since the base-station may already loaded with $N_1$ modems, and assuming proportional fair scheduling, the average performance of a user in the network may increase from $\eta_1\lambda_1 W_1/N_1$ to $2\eta_1\lambda_1 W_1/(N_1+1)$. $T_u$ ($S_1$, $S_1$)=$2\eta_1\lambda_1 W_1/(N_1+1)$. When $N_1$ is large in a loaded network, the user that uses two WWAN modems may get nearly twice the throughput then would otherwise be had when using only one modem, while marginally affecting all other users (the improvement here is $(2/(N_1+1))/(1/N_1)=2/(1+1/N_1)$. It may further be noted that in such an aspect, if all users turn on two modems on the same channel, the average performance of a user with two modems degenerates to the average performance for each user with one modem (e.g., since there are 2 $N_1$ modems in the system and 2 modems per user sharing the total resources available in the wireless channel). Thus the available performance in a WWAN may depend on a number of active and connected users at any given time. In addition, the performance for a specific user may also depend on the location of the user relative to the basestation (e.g., EnodeB/NodeB/BTS), the link conditions as experienced by the user based on the user's location and mobility, the modulation and coding scheme used by a WWAN modem, etc.

In general, concurrent link aggregation and be pursued with different Radio Access Technologies (RATs) on different channels (potentially non-contiguous) to utilize available capacity from each RAT and then aggregate the capacities available from each RAT. While such concurrent link aggregation provides the sum of available performance across networks, it may not increase or decrease the energy consumed on the platform. For example, with similar data links/technologies, twice the power may be consumed for a given communication task such as downloading a file or an email attachment, while the communication time is reduced in half, so that the energy consumed is approximately the same as the utilizing just one data link. However, the communication task may be completed in half the time providing a better overall performance and user experience on the platform.

Further, MultiPath TCP for aggregation across available WWAN paths using multiple WWAN modems may be used on one mobile platform (e.g., such as a smartphone, a car modem, a laptop, a tablet, etc.) or on multiple platforms (e.g., such as a smartphone and a tablet, a tablet and a laptop, or a smartphone and a tablet and a laptop, etc).

In one aspect, using a Multipath TCP-based approach based on the differential bandwidths as determined by congestion windows $CW_i$ for each of N paths, traffic can be split in the ratio proportional to the congestion windows, such as in the ratio $CW_1:CW_2:CW_3: \ldots :CW_N$. In one aspect, a less expensive path may be utilized more, so that pricing considerations can also impact the proportional distribution across paths.

Further, in one aspect, based on the differential delay across paths based on RTT (Round Trip Time), an early transmission of data on a slower path or a delayed transmission on a faster path can be performed at a transmitting aggregation endpoint so that packets arrive closer in time at a receiving aggregation endpoint, thereby reducing buffering requirements at a receiving client with improved flow management.

Still further, in one aspect lightweight overlays using UDP can be used to exchange information between a client and a network tunneling anchor. These overlays may provide additional dynamic information about the quality of each the WWAN links, by exchanging the current WWAN state and/or the link quality (such as the current modulation and coding scheme being used) and/or the link utilization (such as the fraction of time utilized on the network) as perceived by a WWAN modem. Such information can be used to assist in determining an expected trend for the expected performance of the paths in a Multipath TCP connection, to enable a proactive adaptation to changing conditions as perceived by the WWAN modems at the client. Additionally, paths can be dynamically added or deleted within the Multipath TCP session. Further, for application-layer aggregation, a Multipath TCP session can be directly set up with an application server on the internet. Additionally or in the alternative, a Multipath TCP tunneling anchor may be suggested in an operator's network or across operator networks. A Multipath TCP tunnel can provide higher bandwidths utilizing multiple WWAN modems associated with a mobile platform, and may not require changes to application servers on the internet which merely use the tunnel. The tunnel persists during transitions between states of single path-utilization to multipath-utilization in the system. In certain aspects, the aggregated bandwidth over multiple paths can be made available to other mobile platforms as well, when the mobile platform that aggregates bandwidth serves as an access point to other mobile platforms.

Various aspects of an apparatus will now be presented with reference to FIG. 1. FIG. 1 is a conceptual block diagram illustrating a hardware configuration for an apparatus. The apparatus 100 includes a processor 104, machine-readable media (memory) 108 coupled to the processor 104, one or more modems 102 coupled to the processor 104, and a transceiver 106 coupled to the processor 104. The processor 104 and the machine-readable media 108 may together be referred to as a processing system 110. However, the processing system 110 may include the processor 104 without the machine-readable media 108 for certain processor 104 configurations.

The modems 102 cooperate for bandwidth aggregation using Multi-path Transport. That is, the cooperation may be implemented across a plurality of modems that are within the apparatus 100 or are within both the apparatus 100 and one or more wireless nodes within wireless proximity of the apparatus 100.

The processing system 110 may include one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The processing system 110 may also include the machine-readable media 108 for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 110 to perform the various functions described below, as well as other protocol processing functions.

The machine-readable media 108 may include storage integrated into one or more of the processors. The machine-readable media 108 may also include storage external to the one or more processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, the machine-readable media 108 may include a transmission line or a carrier wave that encodes a data signal. Those skilled in the art will recognize how best to implement the described functionality for the processing system.

Figure 2:
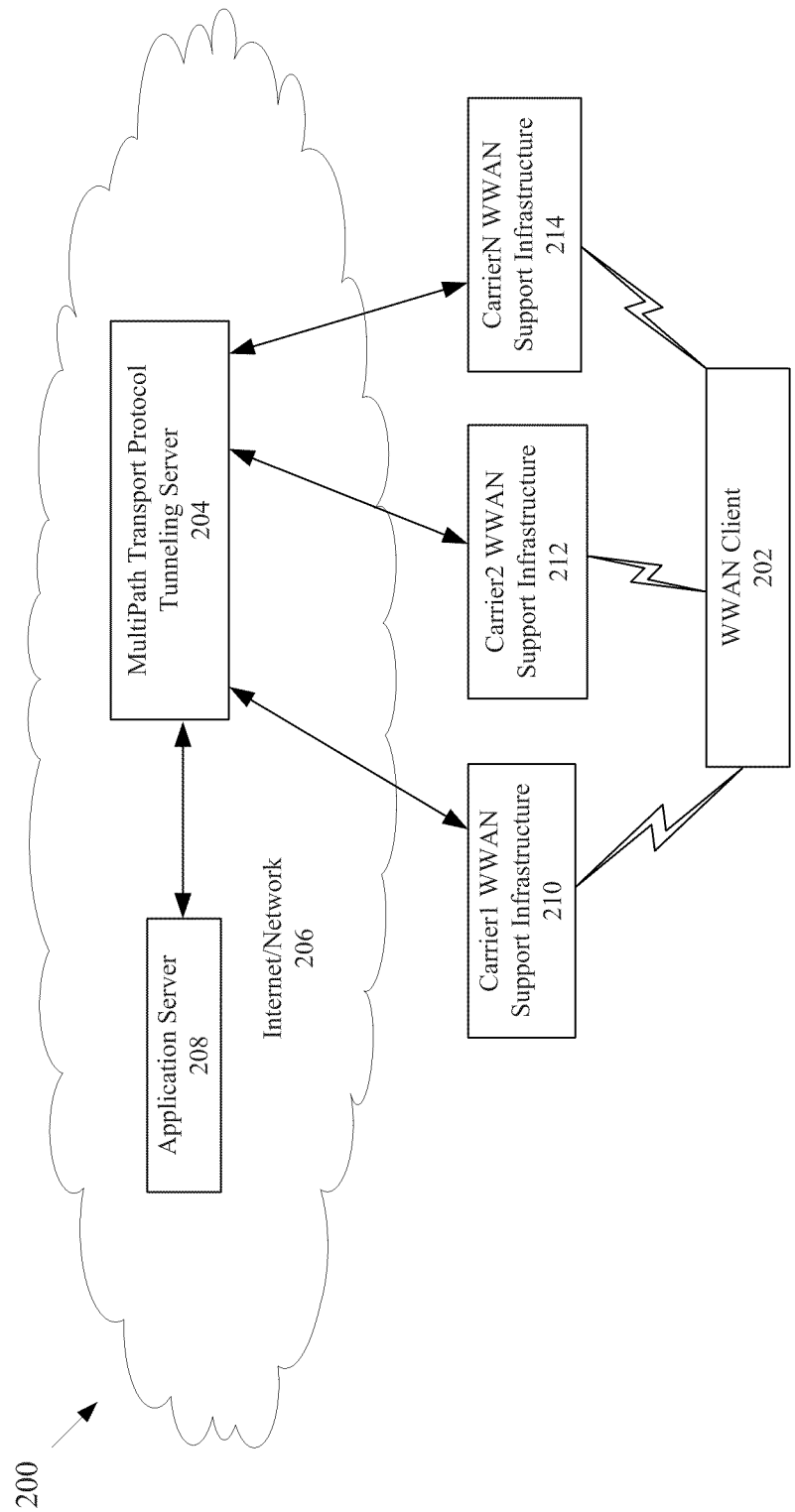
FIG. 2 is a block diagram illustrating a Multipath Transport tunneling service.

FIG. 2 is a block diagram 200 illustrating a tunneling service across WWAN carriers. A MultiPath Transport Protocol (MPTP) inter-carrier tunnel is established between the WWAN client 202 and a MPTP tunneling server 204 through one or more support infrastructures, e.g., Carrier WWAN support infrastructure 1, 2, . . . N (210, 212, 214), to allow for communication with the application server 208. The WWAN client 202 has a plurality of modems 102 for communicating concurrently with the MPTP tunneling server 204 through the one or more support infrastructures (210, 212, 214). When the client 202 connects to the Internet/Network 206, its data flow is established via the tunneling server 204. The MPTP may be MultiPath TCP or the SCTP.

Figure 3:
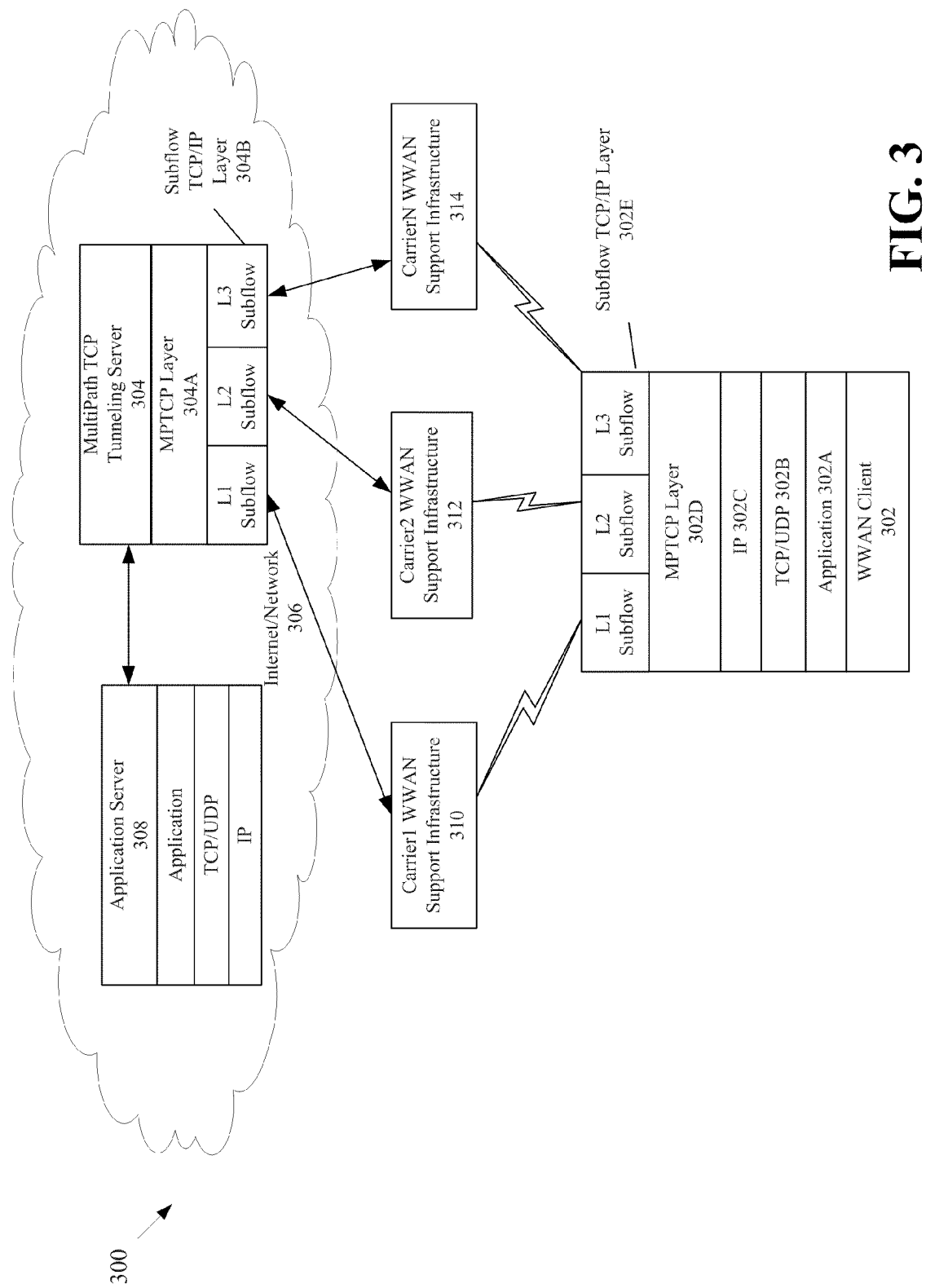
FIG. 3 is a block diagram illustrating a tunneling service across WWAN carriers using MultiPath TCP.

FIG. 3 is a block diagram 300 illustrating a tunneling service across WWAN carriers using MultiPath TCP. A MultiPath TCP inter-carrier tunnel is established between the WWAN client 302 and a MultiPath TCP tunneling server 304. In one aspect, as discussed with reference to FIGS. 10, 11 and 12, WWAN client 302 may be operable to act as an ad hoc access point for other devices (e.g., UEs). In such an aspect, the WWAN client 302 may communicate with the other devices using the same TCP as used for communications between the WWAN client 302 and the MultiPath TCP tunneling server 304. In another aspect, the WWAN client 302 may communicate with the other devices based on wireline and/or wireless protocols.

When the client 302 connects to the Internet/Network 306, its data flow is established via the tunneling server 304. The MultiPath TCP tunneling server 304 provides a Client-VPN_Public_IP address, which may or may not be dynamically allocated, that the client 302 includes in packets when communicating with an application server 308 on the Internet/Network 306. For each path through each carrier, the client 302 can request a different IP address from the WWAN infrastructure 310, 312, 314 for each carrier. For example, if the client 302 can use N carriers, the client 302 receives address ClientTunnelIP1 for the first carrier, address ClientTunnelIP2 for the second carrier, and so on, with address ClientTunnelIPN for the $N^{th}$ carrier. The tunneling server 304 provides N IP addresses TunnelServerIP1, TunnelServerIP2, . . . , and TunnelServerIPN correspondingly for the MPTP connections. An application server 308 on the Internet/Network 306 can have its own IP address ApplicationServer_IP.

A legacy TCP or User Datagram Protocol (UDP) session is established between the application server 308 and the client 302 using the IP addresses ClientVPN_Public_IP and ApplicationServer_IP. The TCP packets for the application are carried over the MultiPath TCP tunnel established using the IP addresses ClientTunnelIP1, ClientTunnelIP2, . . . , ClientTunnelIPN for the client 302, and IP addresses TunnelServerIP1, TunnelServerIP2, . . . , TunnelServerIPN for the tunneling server 304. Packets leaving the client 302 are wrapped into the MultiPath TCP tunnel and delivered to the tunneling server 304. The tunneling server 304 unwraps the packets and sends the packets destined to the IP address ApplicationServer_IP. Packets from the application server 308 are sent to the ClientVPN_Public_IP address which is managed in the domain of the tunneling server 304. When the tunneling server 304 receives the packets from the application server 308, the tunneling server 304 wraps the packets into the Multipath TCP tunnel between the tunneling server 304 and the client 302. When the packets reach the client 302, the packets are unwrapped by the client 302, and then subsequently delivered to the legacy TCP or UDP endpoint for the application on the client 302.

The client 302 may have a MultiPath TCP layer 302D and a subflow TCP/IP layer 302E so that the client 302 can utilize MultiPath TCP through the legacy TCP 302B, 302C via the Application 302A. The client 302 utilizes MultiPath TCP by sending a communication to and receiving a communication from the tunneling server 304. In such a configuration, the MultiPath TCP layer 302D relays the communication to the subflow TCP/IP layer 302E, which is a multi-path TCP capable layer and which sends the communication to the tunneling server 304 at the IP addresses TunnelServerIP1, TunnelServerIP2, . . . , TunnelServerIPN from each of the IP addresses ClientTunnelIP1, ClientTunnelIP2, . . . , ClientTunnelIPN, respectively (corresponding to L1, L2, L3). The subflow TCP/IP layer 302E receives communication from the tunneling server 304 and relays the communication to the MultiPath TCP layer 302D. The tunneling server 304 may similarly have a MultiPath TCP layer 304A and a subflow TCP/IP layer 304B. The subflow TCP/IP layers 302E, 304B manage each subflow independently including congestion control mechanisms and slow-start mechanisms for each sub-flow. The MultiPath TCP layers 302D, 304A merge/split data across the subflows.

Figure 4:
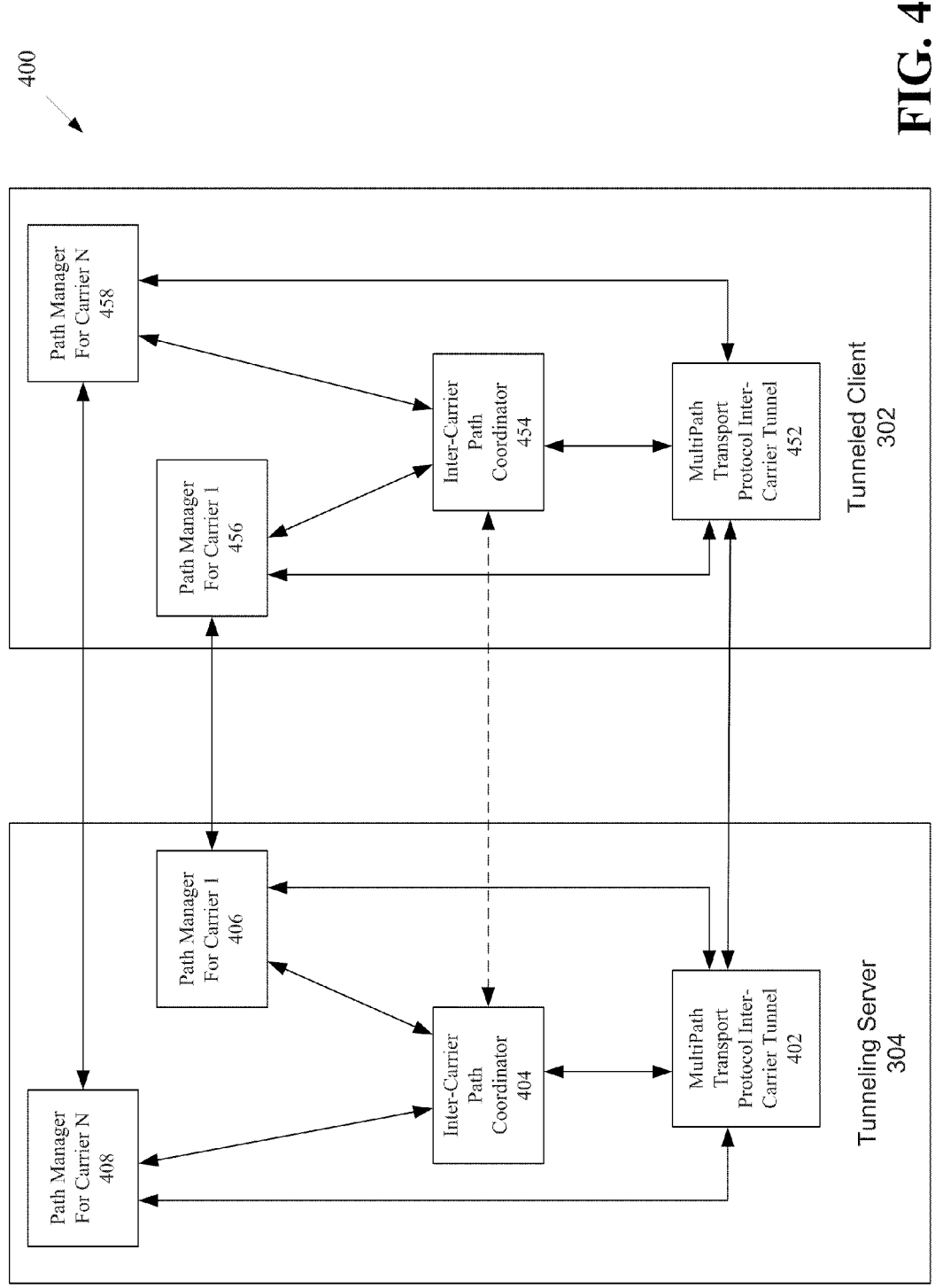
FIG. 4 is a block diagram illustrating path coordination and path management overlay support for inter-carrier skew and flow management.

FIG. 4 is a block diagram 400 illustrating path coordination and path management overlay support for inter-carrier skew and flow management. Path managers 406, 408 in the tunneling server and path managers 456, 458 in the tunneled client are created for each path associated with each WWAN carrier. The path managers enable discovery and setup for each subflow for each carrier. An inter-carrier path coordinator 404 is established at the tunneling server 304 and an inter-carrier path coordinator 454 is established at the tunneled client 302. The inter-carrier path coordinators 404, 454 dynamically analyze the performance of each path and then optimize the distribution of flow across the available paths. Application-layer overlays can be established between the tunneling server 304 and the tunneled client 302 to exchange information between the inter-carrier path coordinators 404, 454 and the path managers at tunneled client 302 and tunneling server 304 to optimize the simultaneous utilization of paths using the MPTP tunnel 402, 452 between the nodes 302, 304. In one aspect, as discussed with reference to FIGS. 10, 11 and 12, tunneling client 302 may be operable to act as an ad hoc access point for other devices (e.g., UEs).

Based on the knowledge of the effective bandwidths for each of the paths (such as using the congestion window size of each sub-flow and/or utilizing information regarding WWAN link quality/utilization/loading information for each path) and the effective delays on each path (based on RTT (round-trip-time) measurements for each sub-flow), traffic flow can be optimized. If the effective bandwidths are B1, B2, . . . , BN, then the traffic could be split in the ratio B1:B2: . . . :BN across the sub-flows. Also, if the delays are D1, D2, . . . , DN, then packets for the paths with longer delay could be scheduled for transmission early based on the differential delays across paths, so that packets can arrive closer in time at the receiving MPTCP endpoint at the client. Such scheduling can reduce the buffering requirements at the receiving MPTCP endpoint. However, such scheduling is not a requirement, as packets can get buffered at the receiving MPTCP endpoint, and eventually delivered in order by aggregating the packets across subflows.

The tunneling server 304 can be located purely within the WWAN infrastructure 310-314 that supports the multiple carriers. When multiple WWAN infrastructures 310-314 are needed to support different WWAN carriers, then the tunneling server 304 can be located external to the WWAN infrastructures 310-314. Such a tunneling service is capable of managing skews across WWAN carriers, thereby enabling aggregation of available bandwidth across WWAN carriers. Legacy application servers can leverage the aggregated performance without needing to support MultiPath TCP.

As described supra, through the use of a tunneling service, a client 302 can utilize MPTP communication with an application server that does not have MPTP capability. In another configuration, as described infra with respect to FIG. 5, FIG. 6, FIG. 7, and FIG. 8, a client can utilize MPTP through the use of cooperative devices.

Figure 5:
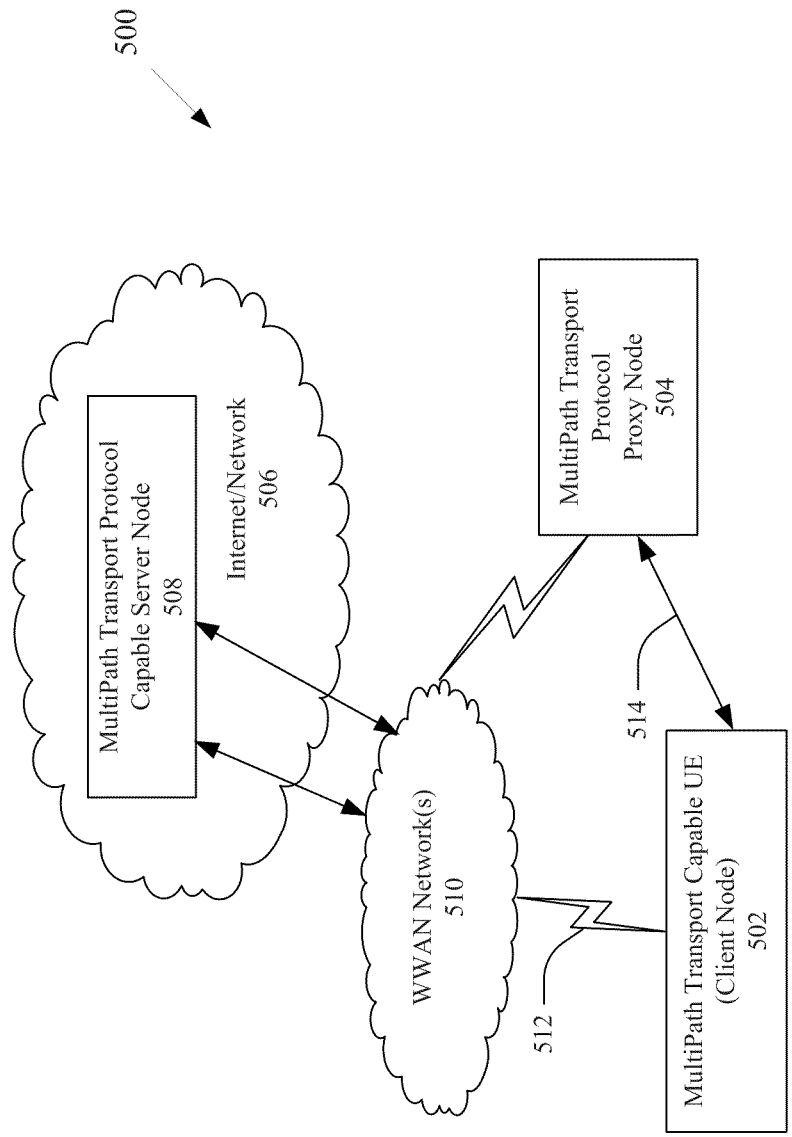
FIG. 5 is a block diagram illustrating cooperative MultiPath Transport.

FIG. 5 is a block diagram 500 illustrating cooperative MPTP. The MPTP capable UE (i.e., client node) 502 has a plurality of modems 102 for communicating concurrently with the one or more WWAN networks 510 through one or more communications paths 512. In one aspect, the communications paths 512 may be enabled to use a MPTP. Additionally, system 500 includes at least one proxy node 504 which may communication with client node 502 through peer-to-peer communication 514. In one aspect, peer-to-peer communications 514 may be supported using one or more wired and/or wireless protocols. When the proxy node 504 comes within wireless proximity of the client node 502, the proxy node 504 may be discovered by the client node 502. Using cooperative MPTP, the client node 502 may send information to and receive information from the MPTP capable server 508 residing on the Internet/Network 506. As discussed supra, MPTP may be MultiPath TCP or SCTP.

Figure 6:
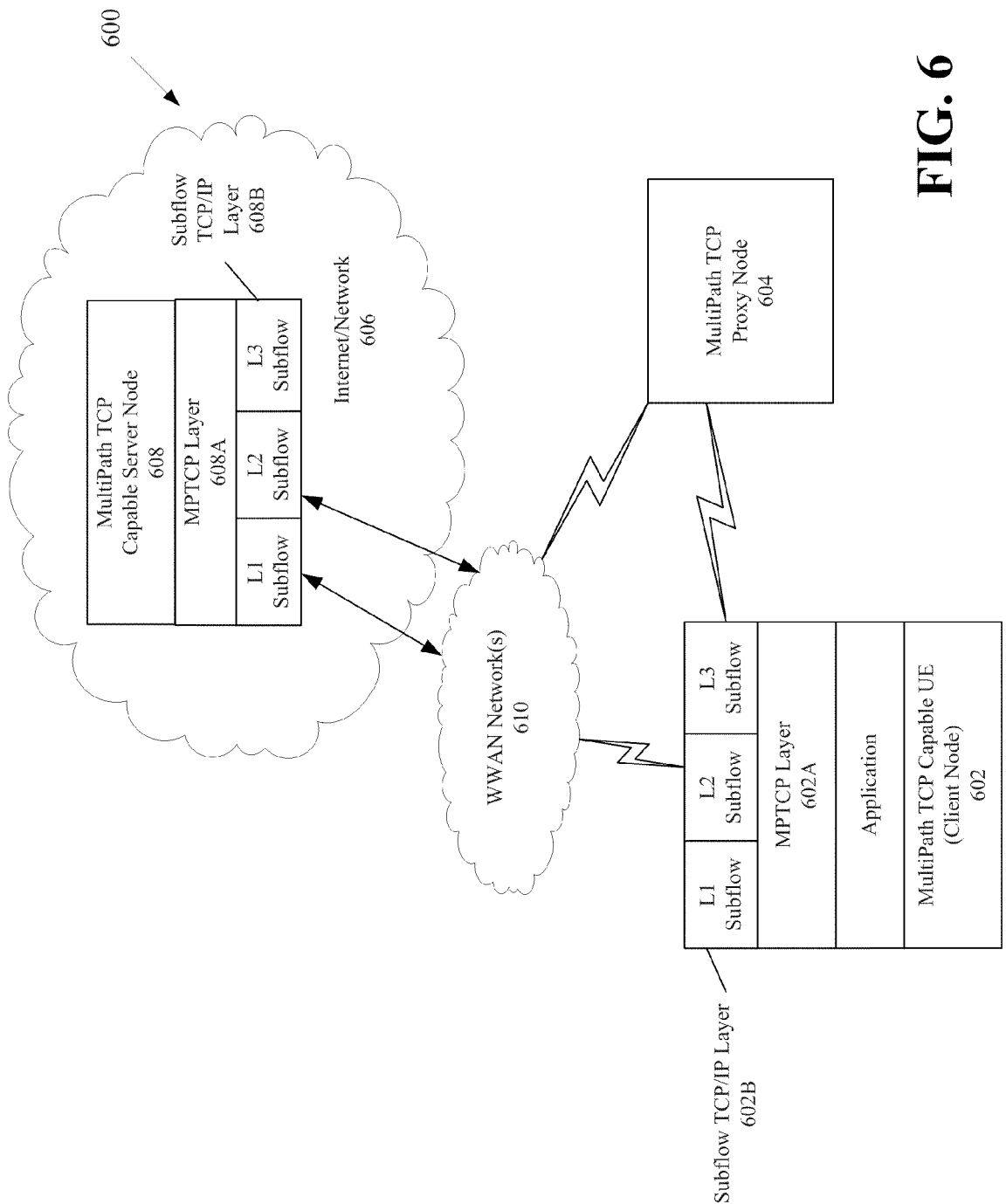
FIG. 6 is a block diagram illustrating cooperative MultiPath TCP.
Figure 7:
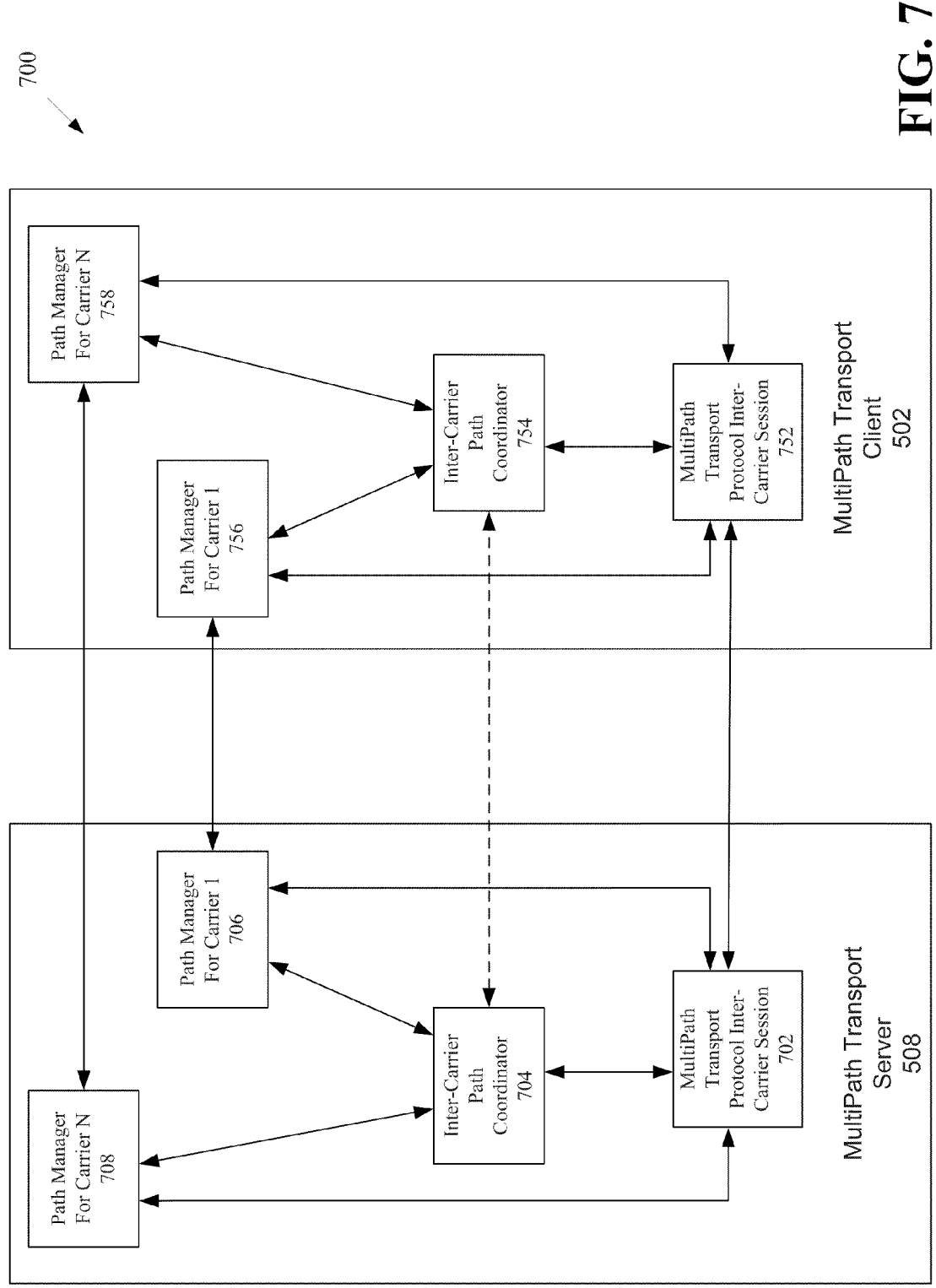
FIG. 7 is another block diagram illustrating path coordination and path management overlay support for inter-carrier skew and flow management.
Figure 8:
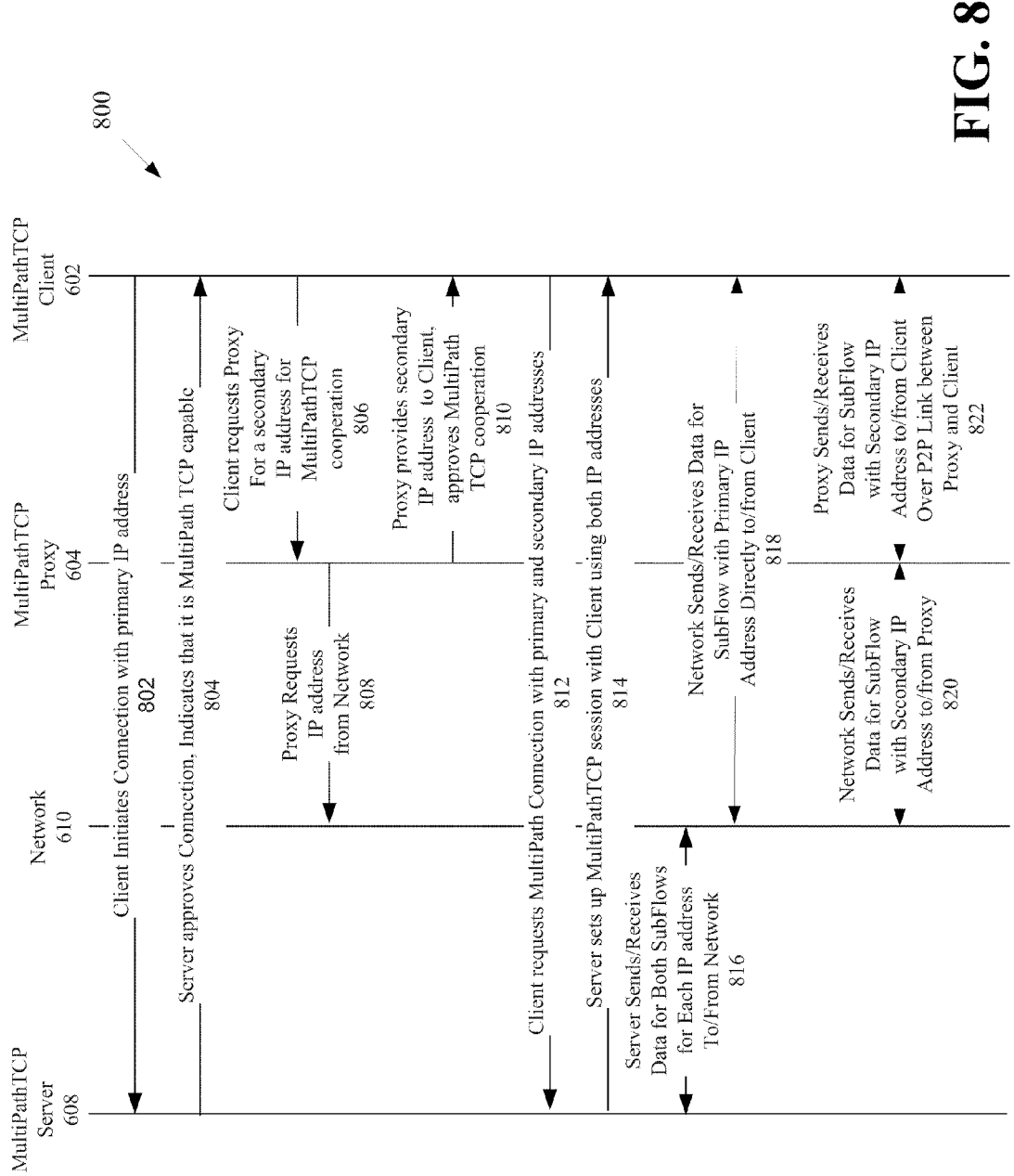
FIG. 8 is a call-flow diagram for the cooperative MultiPath TCP.

FIG. 6 is a block diagram 600 illustrating cooperative MultiPath TCP. FIG. 7 is a block diagram 700 illustrating path coordination and path management overlay support for inter-carrier skew and flow management. FIG. 8 is a callflow diagram 800 for the cooperative MultiPath TCP. The MultiPath TCP capable UE (e.g., client node) 602 has a plurality of modems 102 for communicating concurrently with the WWAN network 610 and at least one proxy node 604 through peer-to-peer communication. In one aspect, peer-to-peer communications may be supported using one or more wired and/or wireless protocols. When the proxy node 604 comes within wireless proximity of the client node 602, the proxy node 604 may be discovered by the client node 602. The client node 602 subsequently starts a TCP session with a server 608 on the Internet/Network 606 using its IP address (called the primary IP address) (802), and discovers that the server 608 is MultiPath TCP capable (804). In one aspect, as discussed with reference to FIGS. 10, 11 and 12, client node 602 may be operable to act as an ad hoc access point for other devices (e.g., UEs). In such an aspect, the client node 602 may communicate with the other devices using the same TCP as used for communications between the client node 602 and server 604. In another aspect, the client node 602 may communicate with the other devices based on wireline and/or wireless protocols. The client 602 then requests the proxy node 604 for a secondary IP address (806). The proxy node 604 requests an IP address from the network 610 (808). When the proxy node 604 receives an IP address from the network 610, the proxy node 604 provides that IP address to the client 602 (810). The client 602 uses that IP address as its secondary IP address. The client 602 sets up a MultiPath TCP session with the server 608 using its primary IP address and its secondary IP address (812, 814). In other embodiments, the client node 602 may first obtain a primary IP address from the proxy node 604 to set up a path with the server 608 through the proxy node 604. This may happen due many reasons that the client 602 may consider. These reasons could include the possibility that the WWAN network may not be available for direct access for a client, or a subscription may not be available at a given location for the client to the network, or it may lower energy or lower cost to use a path through the proxy node, or that the performance of the network through the proxy node may be better than a direct path. Subsequently, after discovery that the server 608 is MultiPath TCP capable, the client node 602 may add one or more secondary IP addresses for a direct path through its WWAN network based on availability of its network or based on the cost of using the networks, or based on energy considerations, or based on performance requirements. The client node 602 may also add one or more secondary IP address for another path through the same proxy node 604 or a different proxy node. The client node 602 and the proxy node 604 may communicate with different WWAN networks. In general, the WWAN networks or channels or protocols or technologies that the proxy node and the client node use to communicate with their respective networks can be the same or different. Traffic from the server 608 for each subflow for each IP address reaches the network 610 (816). The network 610 directs the subflow traffic for the primary IP address to the client 602 (618). The network 608 directs the subflow traffic for the secondary IP address to the proxy node 604 (820). The proxy node 604 then delivers the traffic received for the client's secondary IP address to the client 602 over a peer-to-peer (P2P) link between the proxy node 604 and the client 602 (822). A P2P application can be used to deliver the packets associated with the Secondary IP Subflow. Subsequently the subflows are merged at the client 602, and delivered to the client application. In the reverse path from the client 602 to the server 608, the client sends subflow traffic for the primary IP address to the network 610 (818), and the subflow traffic for the secondary IP address to the proxy node 604 (822) which forwards to the network 610 (820). The network 610 sends traffic for both subflows to the server 608 (816). In general, a client node 602 may obtain multiple IP addresses for each of the WWAN networks that it can utilize directly, and for each of the WWAN networks that the proxy nodes in its vicinity can access.

The network 610 can be a WWAN or multiple WWANs such that a proxy node 604 and a client node 602 can connect to their respective WWANs. This allows a client 602 to increase the effective bandwidth for an application using a different WWAN for the proxy node 604, or using a different WWAN channel in the same WWAN for both the proxy node 604 and the client 602. No changes are required in the WWAN(s). Because the proxy node 604 supplies its IP address to the client 602 to use as a secondary IP address, as far as the network 610 is concerned, all traffic for the secondary IP address is meant for the proxy node 604. The network 610 can be oblivious to the fact the proxy node 604 has lent its IP address to the client 602. As far as the server 608 is concerned, it is communicating only with the client 602. A P2P application between the proxy node 604 and the client 602 is used to communicate subflow traffic for the secondary IP address. When communicating with a WWAN, the proxy node 604 and the client 602 can set up Packet Data Protocol (PDP) contexts to set up their primary and secondary IP addresses. The MultiPath TCP through cooperative proxy nodes can be extended to use more than two paths, for example a tertiary path could be set up using the same proxy or a different proxy, and therefore the cooperative nature is scalable to multiple paths using multiple proxy nodes, without changes required to the network 610.

Referring to FIG. 7, path managers 706, 708 in the MultiPath Transport Server 508 and path managers 756, 758 in the MultiPath Transport Client 502 are created for each path associated with each WWAN carrier. The path managers enable discovery and setup for each subflow for each carrier. An inter-carrier path coordinator 704 is established at the server 508 and an inter-carrier path coordinator 754 is established at the client 502. The inter-carrier path coordinators 704, 754 dynamically analyze the performance of each path and then optimize the distribution of flow across the available paths. Application-layer overlays can be established between the server 508 and the client 502 to exchange information between the inter-carrier path coordinators 704, 754 and the path managers at client 502 and server 508 to optimize the simultaneous utilization of paths using the MPTP session 702, 752 between the nodes 508, 502.

FIG. 8 is a call-flow diagram 800 for a cooperative MutliPath TCP. In one aspect, system 800 may include MultiPath TCP client 602, MultiPath TCP Proxy 604, network 610, and MultiPath TCP Server 608. At sequence step 802, MultiPath TCP client 602 may initiate a connection with a primary IP address through MultiPath TCP server 608. At sequence 804, MultiPath TCP server 608 may approve the connection. In one aspect, the MultiPath TCP server 608 may further indicate that the connection is MultiPath TCP capable. At sequence step 806, MultiPath TCP client 602 may request a secondary IP address for MultiPath TCP proxy 604. In one aspect, MultiPath TCP proxy 604 and MultiPath TCP client 602 may cooperatively communicate with MultiPath TCP server 608 through network 610. At sequence step 808, MultiPath TCP proxy 604 may request and obtain an IP address from network 610. At sequence step 810, MultiPath TCP proxy 604 may communicate the obtained IP address to MultiPath TCP client 602. In one aspect, MultiPath TCP proxy 604 may also approve MultiPath TCP cooperative communication.

At sequence step 812, MultiPath TCP client 602 may request a MultiPath connection from MultiPath TCP server 608. In one aspect, the request may include the primary and secondary IP addresses. At sequence step 814, MultiPath TCP server 608 may set up a MultiPath TCP session using multiple IP addresses. At sequence step 816, MultiPath TCP server 608 may communicate with network 610 to send and/or receive data for the multiple subflows set up for the MultiPath TCP session. At sequence step 818, network 610 may send and/or receive data for subflows to the one of the multiple IP addresses associated with the MultiPath TCP client 602. Additionally, at sequence step 820, network 610 may send and/or receive data for subflows to the one of the multiple IP addresses associated with the MultiPath TCP proxy 604, and thereafter network 610 may send and/or receive data for subflows to the one of the multiple IP addresses associated with the MultiPath TCP may communicate the subflows to the MultiPath TCP client 602, at sequence step 822.

Additionally, or in the alternative, MultiPath TCP client 602 may be operable to act as an ad hoc access point for other devices (e.g., UEs). In such an aspect, the MultiPath TCP client 602 may communicate with the other devices using the same TCP as used for communications between the MultiPath TCP client 602 and server 610. In another aspect, the MultiPath TCP client 602 may communicate with the other devices based on wireline and/or wireless protocols.

Figure 9:
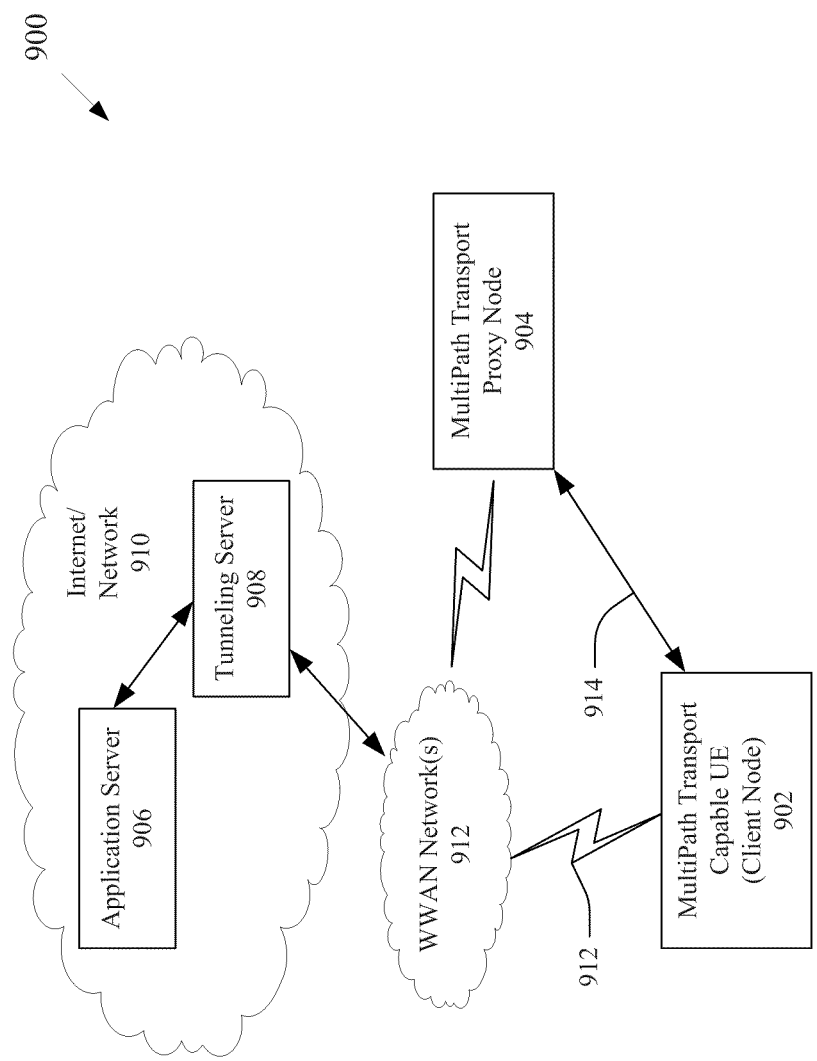
FIG. 9 is another block diagram illustrating cooperative MultiPath Transport.

FIG. 9 is another block diagram 900 illustrating cooperative MultiPath TCP. If the application server 906 is not MultiPath TCP capable, communication between the application server 906 and the client 902 may be handled through the tunneling server 908. The application server 906 is in the Internet/Network 910. The tunneling server 908 may also be in the Internet/Network 910. Alternatively, the tunneling server may reside in the one or more WWAN networks 912. The tunneling server 908 may handle the communication with both the client 902 and the proxy node 904 through one or more communications paths 912. In one aspect, the communications paths 912 may be enabled to use a MPTP. Additionally, system 900 includes at least one proxy node 904 which may communication with client node 902 through peer-to-peer communication 914. In one aspect, peer-to-peer communications 914 may be supported using one or more wired and/or wireless protocols.

Figure 10:
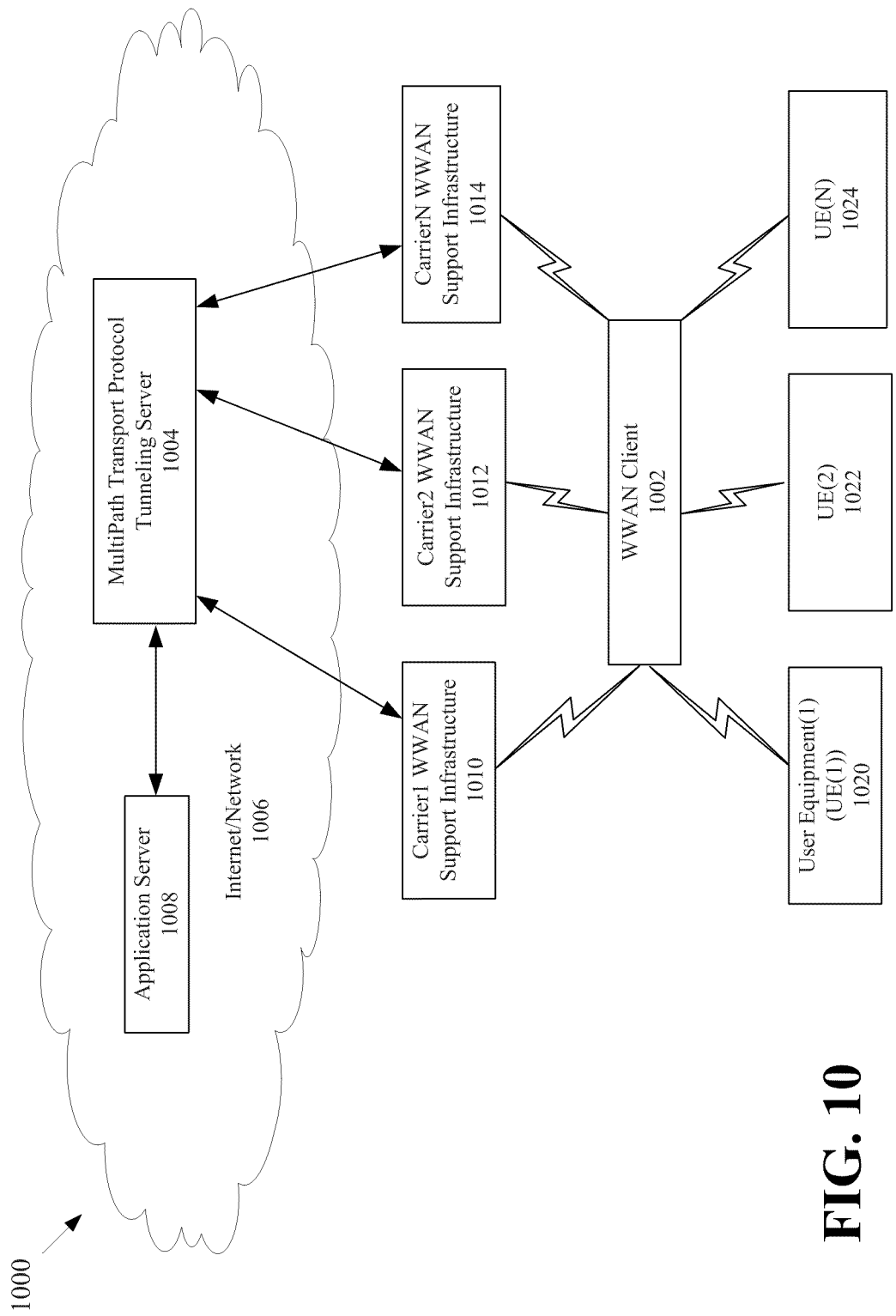
FIG. 10 is a block diagram illustrating a Multipath Transport tunneling service in which a UE may be operable to act as a WWAN client node.
Figure 11:
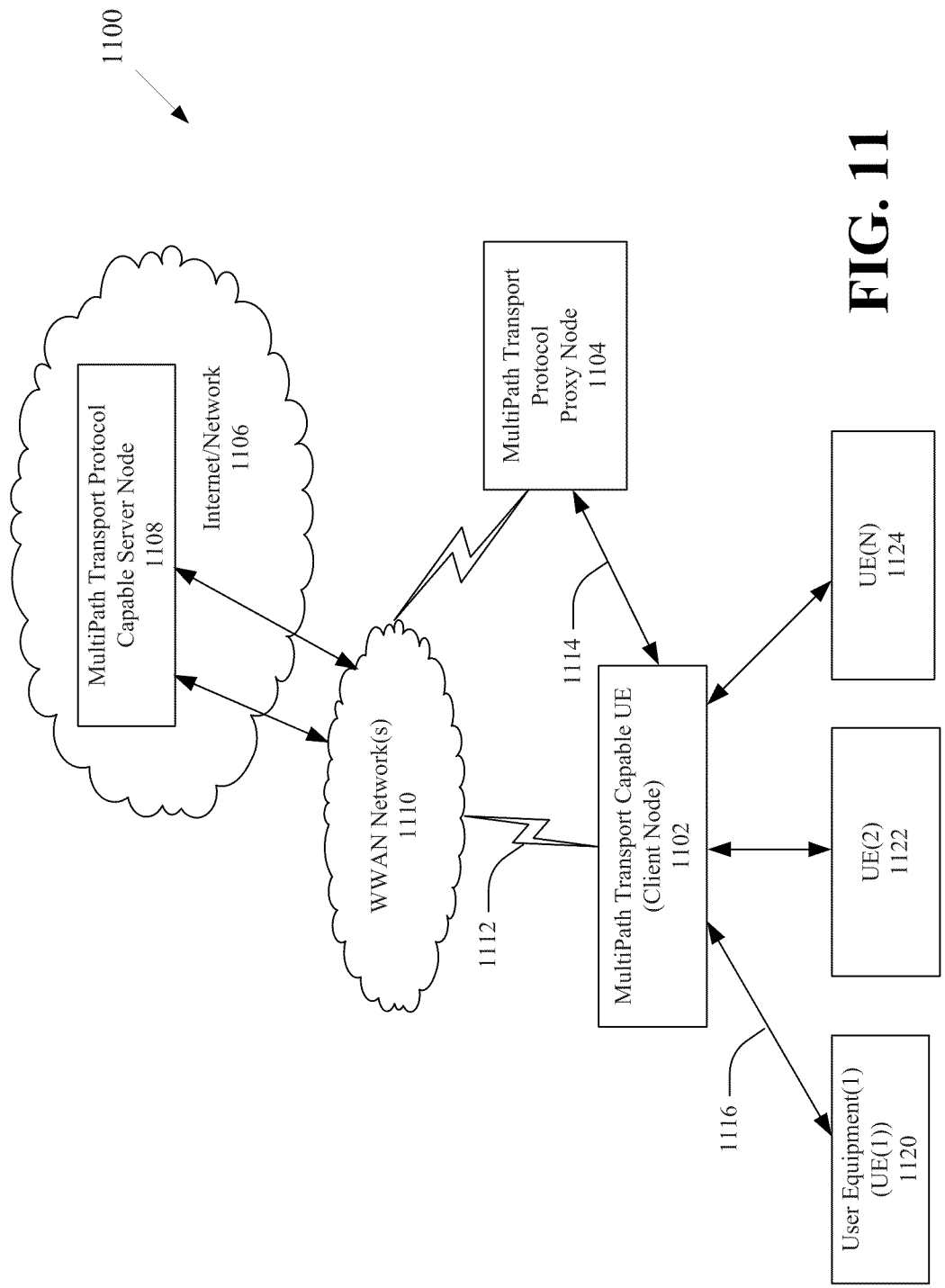
FIG. 11 is a block diagram illustrating cooperative MultiPath Transport in which a user equipment may be operable to act as a WWAN client node.
Figure 12:
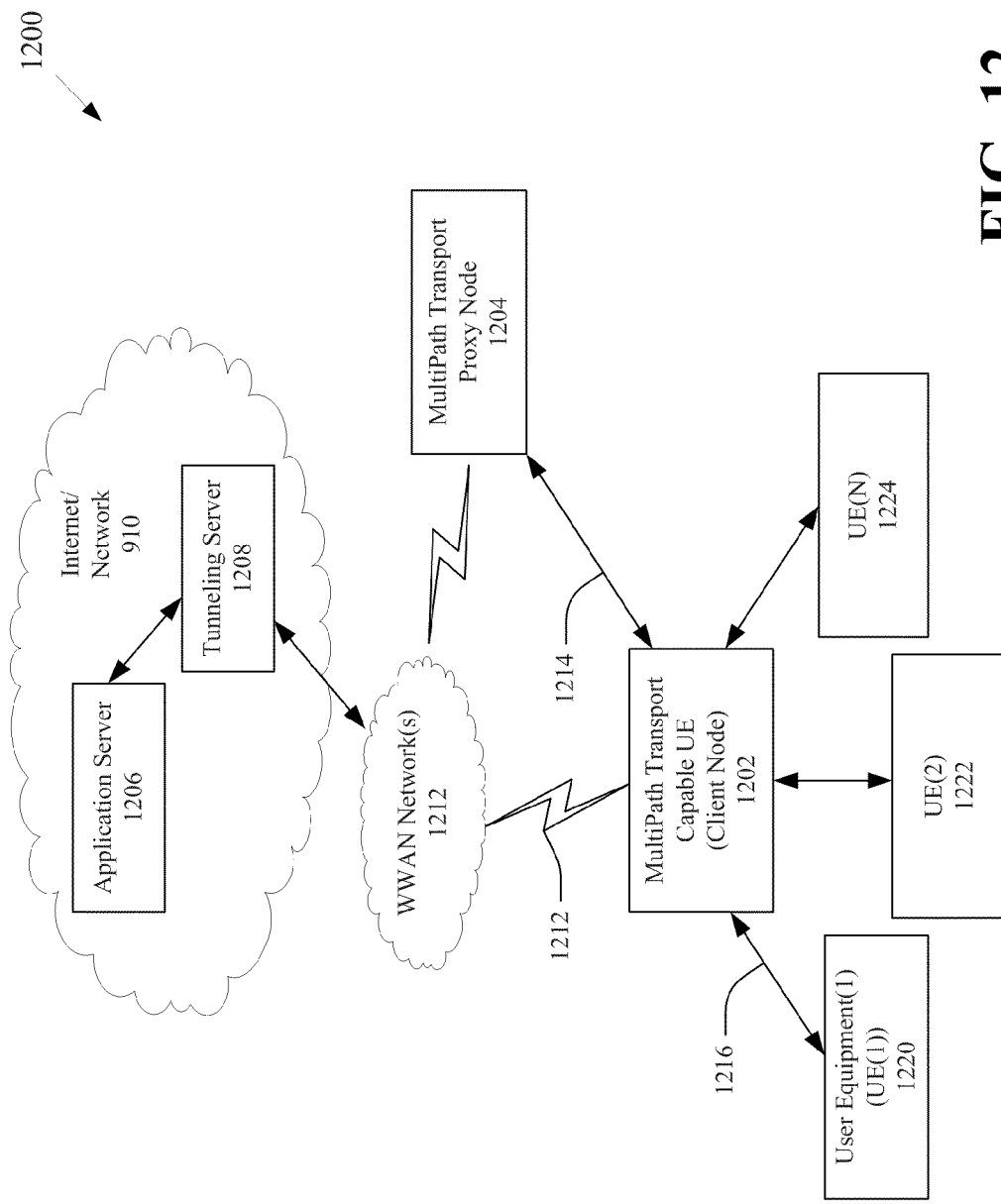
FIG. 12 is another block diagram illustrating cooperative MultiPath Transport in which a UE may be operable to act as a WWAN client node.

As discussed further with reference to FIGS. 10, 11 and 12, a WWAN client may act local ad hoc access point for other devices (e.g., UEs).

FIG. 10 is a block diagram 1000 illustrating a tunneling service across WWAN carriers. A MultiPath Transport Protocol (MPTP) inter-carrier tunnel is established between the WWAN client 1002 and a MPTP tunneling server 1004 through one or more support infrastructures, e.g., Carrier WWWAN support infrastructure 1, 2, . . . N (1010, 1012, 1014), to allow for communication with the application server 1008. The WWAN client 1002 has a plurality of modems 102 for communicating concurrently with the MPTP tunneling server 1004 through the one or more support infrastructures (1010, 1012, 1014). When the client 1002 connects to the Internet/Network 1006, its data flow is established via the tunneling server 1004. The MPTP may be MultiPath TCP or the SCTP.

Further, in one aspect, WWAN client 1002 may be operable to communicate with one or more UEs (1020, 1022, 1024). In such an aspect, WWAN client 1002 may expose one or more ad hoc network access points to the one or more UEs, e.g., UE(1) 1020, UE(2) 1022, UE(N) 1024, etc., to allow the UEs 1020, 1022, 1024 to communicate with entities, such as application server 1008. In one aspect, the ad hoc network used for communication between the WWAN client 1002 and the one or more UEs 1020, 1022, 1024 may be based on wireline and/or wireless protocols. Further, the wireless communications may be based on an 802.11 protocol.

FIG. 11 is a block diagram 1100 illustrating cooperative MPTP. The MPTP capable user equipment (UE) (i.e., client node) 1102 has a plurality of modems 102 for communicating concurrently with the one or more WWAN networks 1110 through one or more communications paths 1112. In one aspect, the communications paths 1112 may be enabled to use a MPTP. Additionally, system 1100 includes at least one proxy node 1104 which may communication with client node 1102 through peer-to-peer communication 1114. In one aspect, peer-to-peer communications 1114 may be supported using one or more wired and/or wireless protocols. When the proxy node 1104 comes within wireless proximity of the client node 1102, the proxy node 1104 may be discovered by the client node 1102. Using cooperative MPTP, the client node 1102 may send information to and receive information from the MPTP capable server 1108 residing on the Internet/Network 1106. As discussed supra, MPTP may be MultiPath TCP or SCTP.

Further, in one aspect, client node 1102 may be operable to communicate with one or more UEs (1120, 1122, 1124). In such an aspect, client node 1102 may expose one or more ad hoc network access points to the one or more UEs, e.g., UE(1) 1120, UE(2) 1122, UE(N) 1124, etc., to allow the UEs 1120, 1122, 1124 to communicate with entities. In one aspect, the communications 1116 used for communication between the client node 502 and the one or more UEs 1120, 1122, 1124 may be based on wireline and/or wireless protocols. Further, the communications 1116 may be based on an 802.11 protocol. Still further, the communications 116 may be used to enable peer-to-peer communications and may be supported using one or more wired and/or wireless protocols. In one aspect, wired communication may be enabled using a second chip or modem over a high speed inter chip (HSIC) interface (inter-chip USB). Such an aspect may eliminate usual USB transceivers, whiling keeps the rest of the USB design, and a wired connection design.

FIG. 12 is another block diagram 1200 illustrating cooperative MultiPath TCP. If the application server 1206 is not MultiPath TCP capable, communication between the application server 1206 and the client 1202 may be handled through the tunneling server 908. The application server 1206 is in the Internet/Network 1210. The tunneling server 1208 may also be in the Internet/Network 1210. Alternatively, the tunneling server may reside in the one or more WWAN networks 1212. The tunneling server 1208 may handle the communication with both the client 1202 and the proxy node 1204 through one or more communications paths 1212. In one aspect, the communications paths 1212 may be enabled to use a MPTP. Additionally, system 1200 includes at least one proxy node 1204 which may communication with client node 1202 through peer-to-peer communication 1214. In one aspect, peer-to-peer communications 1214 may be supported using one or more wired and/or wireless protocols.

Further, in one aspect, client node 1202 may be operable to communicate with one or more UEs (1220, 1222, 1224). In such an aspect, client node 1202 may expose one or more ad hoc network access points to the one or more UEs, e.g., UE(1) 1220, UE(2) 1222, UE(N) 1224, etc., to allow the UEs 1220, 1222, 1224 to communicate with entities. In one aspect, the communications 1216 used for communication between the client node 1202 and the one or more UEs 1220, 1222, 1224 may be based on wireline and/or wireless protocols. Further, the communications 1216 may be based on an 802.11 protocol. Still further, the communications 1216 may be used to enable peer-to-peer communications and may be supported using one or more wired and/or wireless protocols. In one aspect, wired communication may be enabled using a second chip or modem over a high speed inter chip (HSIC) interface (inter-chip USB). Such an aspect may eliminate usual USB transceivers, whiling keeps the rest of the USB design, and a wired connection design.

Figure 13:
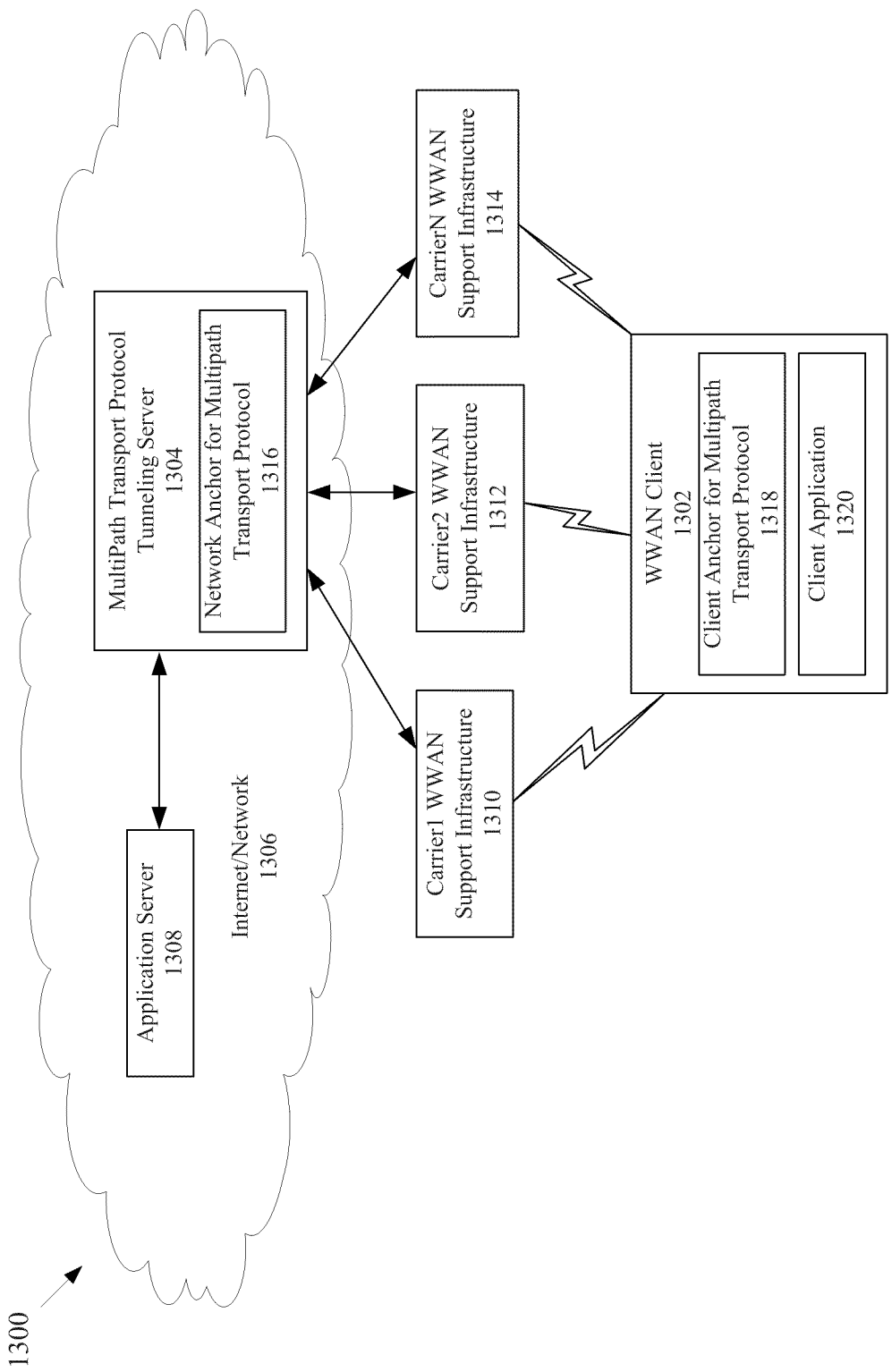
FIG. 13 is a block diagram illustrating a Multipath Transport tunneling service with inter-modem coordination.

FIG. 13 is a block diagram 1300 illustrating a tunneling service across WWAN carriers with inter-modem coordination. An MPTP inter-carrier tunnel is established between the WWAN client 1302 and a MPTP tunneling server 1304 through one or more support infrastructures, e.g., Carrier WWWAN support infrastructure 1, 2, . . . N (1310, 1312, 1314), to allow for communication with the application server 1308. In one aspect, application server 1308 may provide custom application services. For example, when a mobile network operator (MNO) provides the MultiPath Aggregation Anchor 1316 in the network, then application service providers may use services with minimal or no changes. By contrast, if the MNO does not have an anchor supported for multipath aggregation, then an application service provider may install a multipath server 1304, to enable a multipath session to the client device 1302 using available client IP addresses. In such an aspect, the Multi-Path TCP anchor 1316 may reside in a server belonging to the application service provider (e.g., a streaming media content provider could directly set up a multipath session with the client device). A tunneling anchor 1316 may still be used if the content is delivered from a server that is different from the server that may provide the multipath aggregation support. In such an aspect, data may be streamed in a single path from the content provider server 1308 to the MultiPath TCP server 1304, which may then streams data using multipath streams to the client device 1302.

The WWAN client 1302 has a plurality of modems 102 for communicating concurrently with the MPTP tunneling server 1304 through the one or more support infrastructures (1310, 1312, 1314). When the client 1302 connects to the Internet/Network 1306, its data flow is established via the tunneling server 1304. The MPTP may be MultiPath TCP or the SCTP.

In another aspect, if the one of the network paths is established through another operator (such as a shared LTE network path), then based on the costs associated with this shared network at a given location, a path may not be used. For example, a client MPTP anchor 1318 may choose whether to use more than one path, in establishing a connection for a client application 1320, depending on various factors such as, the energy-level of the system, variable energy costs based on the energy efficiency of data communications for each path, fixed costs associated with turning on each path, etc. In one aspect, the client device 1302 may be battery operated. Additionally, the WWANs (1310, 1312, 1314) could engage in coordinated activities, such as Multi-Antenna Interference Cancellation (MAIC) to efficiently use different bands canceling interference from each other's bands. In one aspect, such functionally may include changing the protocols from the RF-front end to the base-band systems.

In another aspect, based on the outcome of the inter-modem coordination, a determination can be made by the platform whether to expose more than one WWAN path for usage by the MultiPath TCP anchor 1316.

In operation, connected users in a WWAN (e.g., 1310) may cause congestion in the WWAN 1310 reducing the performance available. In one aspect, WWAN systems may support low data rate modes of operation for many devices such as, smartphones etc. Due to various applications 1320 running on these mobile devices 1302, there may be a significant amount of overhead signaling activity although the amount of data transferred may be low. This overhead signaling may stem from frequent low-data rate messages such as keep-alive messages for applications 1320, or presence updates for instant messenger implementations. Further, given the increase in the number of users using smartphones, a significant increase in the congestion load has been observed which affects the available performance in the system 1300 to deliver real data to users. In one aspect, using a multipath transport connection over multiple WWANs (1310, 1312, 1314), and using each WWAN minimally, a user unnecessarily causes congestion in the multiple WWANs (1310, 1312, 1314).

Furthermore, a Multipath transport connection may be established with the ability to use multiple WWAN (1310, 1312, 1314) paths. However, a Multipath TCP anchor 1316 may allocate more than one WWAN path when a user application 1320 needs a higher bandwidth that cannot be delivered by one WWAN path. During modes where the user is consuming low bandwidth (e.g., such as a connected user receiving occasional email or IM updates), the user's connected state is maintained by the MultiPath TCP anchor 1316 on only one of the WWANs. A MultiPath TCP anchor 1316 may determine when additional paths through other WWANs are turned on, and added to the multipath transport connection between the client device 1302 and the network 1306. In one aspect, the MultiPath TCP anchor 1316 may maintain a moving average of the aggregate throughput so that during times when the device 1302 is idle or using a low amount bandwidth, WWAN network resources for additional paths may be released to reduce congestion and occupancy in multiple WWAN networks 1300. In another aspect, a lowest cost path (e.g., energy/bit, or price*energy/bit) is utilized at times when bandwidth requirements are low, such that the chosen path meets any delay requirements needed at that time. When higher bandwidths are needed, then additional available WWAN paths may be turned on, utilized, and then released. In still another aspect, paths can be dynamically added or deleted within the MultiPath TCP tunnel 1304. In other words, the tunnel may persist during transitions between states of single-path-utilization to multipath-utilization in the system 1300.

In one aspect, MultiPath TCP anchor 1316 may be operable to provide for earlier transmission of packets of data along a first, slower path, and/or delayed transmission of packets of data along a second, fast path. For example, packet transmissions may be scheduled to be transmitted early on slower path and on time on a comparatively faster path. In another example, packet transmissions may be scheduled for on time transmission on slower path, and delayed on a relatively faster path. Further, any combination of early transmission on slower path, and delayed transmission on faster path may be implemented. In another aspect, device 1302 may be used to provide an access point that utilizes the multipath transport connectivity for backhaul, where the access is provided over a wired or wireless connection. In another aspect, the MutliPath TCP anchor 1316 may split the traffic across multiple paths based the available performance parameters along each path. In one aspect, such performance parameters may include a current TCP congestion window estimate, proactive link performance information available using overlays for path information exchange, etc.

In another aspect, MultiPath TCP anchor 1316 may be operable to partition traffic based on factors such as congestion, window sizes available for each path, etc. In still another aspect, adaptation for traffic partitioning may be performed using real-time information obtained through proactive overlays. As used herein, proactive overlays may be a UDP-based application that exchanges information end-to-end between a multipath client 1302 and a multipath server 1304. For example, a performance change related to a wireless link by a WWAN modem 1302 can be reported to the MPTP server 1304 in the network using a proactive overlay. In one aspect, a proactive overlay may act as a side application that rides on the tunnel to send such proactive performance information. Further, a proactive overlay may be sent over UDP as well directly to the server 1304. If the information is lost due to UDP, it is ok, and previously received information is used.

In one aspect, a path manager may be created for each path between the client 1302 and the server 1304. Further, this path manager may exist at both the WWAN Client 1302 and Tunneling Server nodes 1304. The path managers may be useful to enable discovery and setup for each subflow for each carrier. In another aspect, an IntercarrierPath Coordinator may be established at both nodes to dynamically analyze the performance of each path, and to then optimize the distribution of flow across available paths. Application-layer overlays can be established between the Tunneling-Server 1304 and the TunneledClient 1302 to exchange information between the InterCarrierPath Coordinators and the PathManagers at the WWANClient 1302 and Tunneling-Server nodes 1304 to optimize utilization of multiple paths using the MultipathTCP tunnel between the nodes. Further, a path manager can report a moving average of the performance observed on each path over a period of time, such as several $10^{th}$ of ms or a few $100^{th}$ of ms, so that a degradation in the wireless performance of a given path can be quickly reported by the Client 1302 to the Server 1304.

In another aspect, MultipathTCP anchor 1316 may be operable to allocate one or more paths for forward link flows (e.g., a forward link only (FLO) path). In another aspect, MultipathTCP anchor 1316 may be operable to allocate one or more other paths for bidirectional flows (e.g., high speed packet access (HSPA)). For example, if a FLO radio is used, then data can be received by the client device only on the downlink. Any acknowledgements may traverse on an alternate radio path that provides uplink support. For example the alternate radio path could be provided by LTE or HSPA. Such an alternate radio path could be bidirectional and provide support for both downlink and uplink data flow for a first path. As such, the unidirectional path could provide support for a second data flow in one direction only (either downlink or uplink), and utilize the first path for support for data in the opposite direction (either uplink or downlink respectively). The round trip time (RTT) for the first data flow (RTT_1) would include the delays in both directions for the first path. The RTT for the second data flow (RTT_2) would include delay for one direction along the unidirectional path, and the delay for the opposite direction using the bidirectional first path. The uni-directional delay value for the unidirectional path could be estimated using equation (1):

$$\text{Unidirectional-One-Way-Delay} = \text{RTT}\_2 - 0.5 * \text{RTT}\_1 \qquad (1)$$

Such an implementation may provide additional flexibility in a system 1300, particularly if the second data flow has minimal needs in the uplink direction, such as having the need to send TCP acknowledgements to the MultiPath TCP anchor server that is serving the two paths to the client. For example, an IP address can be obtained for a bidirectional flow over the bidirectional HSPA connection. Thereafter, a second IP address associated with the FLO downlink unidirectional path may also obtained over the bidirectional HSPA connection, since bidirectional connectivity over the unidirectional FLO path is not possible.

In operation, implementations of WWAN modems 1302 may include WWAN multi-modem designs that provide support for only one WWAN data technology to be active at any given time. Based on such an optimized multi-modem design, multi-modem design may allow for concurrent access and utilize multiple WANs. In such an aspect, the amount of concurrency may be based on a number of concurrent WWAN data modems active. Such concurrency may be referred to as the Modem Concurrency Level (MCL) in a concurrent bandwidth aggregation (COBA) system. As a first step, it would be desirable to consider just two WWAN modem designs replicated, so that the MCL is 2. Additional level of modem concurrency for accessing and utilizing WWANs concurrently can be considered in the future.

In another aspect, a COBA system may be implemented using WWAN modems from two different chips each with a WWAN modem, and utilizing two or more WWAN RF chains, to delivering the aggregated bandwidth using a MPTP. In such an aspect, an application processor in one of the chips can perform the aggregation task across the modems. Further, such an implementation allows use of multiple chips each with one or more WWAN modems. Additionally or in the alternative, a single chip may be used where the single chip has multiple WWAN modems integrated and further has applications processing subsystem integrated to aggregate traffic. Additionally, one could include cognitive and whitespace access capabilities into such platforms to provide for additional wireless data paths when available. In other words, aggregation on a single device could manifest itself in phones with dual-UICC dual-data link access. Such a design can deliver higher bandwidth to its own device (such as a phone consisting of these chips), could deliver such higher bandwidth as an access point device that can be utilized by a different device over a wired (USB/Ethernet connection) or wireless (Wi-Fi/WiFi-Direct or other wireless) link, etc. For example, a wired connection may be established over a USB cord connection.

In another aspect, an access point device 1302 may access multiple WWANs 1304 using multiple WWAN modems, and may aggregate bandwidth to other devices over WLAN, USB, Ethernet-based access, etc. Such a device 1302 could be a WiFi access point device, the device could plug into back of an Ethernet port of an existing WiFi access point. Additionally or in the Alternative, the device 1302 could provide access to one or more other devices over a tethered USB connection. A single device solution could also be implemented using a MultiPath TCP aggregator device that allows other devices with WWAN modems to connect over USB. In general, a device may have one or more internal WWAN modems, and can utilize other WWAN modems over wired connectivity. The internal WWAN modems can communicate within a single chip using on-chip interconnects, using buses, processors, and system memory, etc. Additionally or in the alternative, the internal WWAN modems may be connected with inter-chip interconnections such as using various interfaces, such as but not limited to, UART, GPIOs or HSIC interfaces, where one or more WWAN modems are available on different chips. In one aspect, the chips may be connected together on a platform that comprises the device.

Further, in one aspect, two or more devices may be bound together so that at least one WWAN modem on each device could be used, to create a super-device that has multiple WWAN modems. As used herein bonding may be done between devices using wired (e.g., USB, etc.) or wirelessly (Wi-Fi Direct, traditional WiFi, BT, UWB, etc.). Further, aggregation may be performed on one of the devices. In operation, a WWAN modem on a COBA client 1302 may obtain an IP address. Further, a different device such a COBA proxy could be within wired/wireless proximity of the client 1302. Such a proxy device may obtain an IP address from its WWAN, and may lend the IP address to the client device. Thereafter, such a device can provide its IP address to the client, allowing the client to utilize IP addresses available from its WWAN modems, and from at the proxy devices in proximity. In such an implementation, a system may be formed in which available WWAN modems distributed between devices may perform aggregation at an application processor on one of the platforms, and may deliver the aggregated bandwidth in the system. Such a multi-device aggregated solution may also be used to expose an access point for other devices to use multipath WWAN connectivity.

Further, in operation, while COBA may provide a sum of available performance across networks, such a system may not significantly increase or decrease the energy consumed on a platform. For example, with similar data links/technologies, twice the power is consumed for a given communication task such as downloading a file or an email attachment, while the communication time is reduced in half, so that the energy consumed is the same as the utilizing just one data link. However, such a communication task would be completed in half the time providing a better overall performance and user experience on the COBA based platform. Still further, a COBA based system with MultiPath TCP connectivity may allow a peak rate for a single TCP flow to be increased by utilizing multiple WWAN interfaces for the flow which is using MultiPath TCP. Additionally, applications may use the higher bandwidth available at the multipath transport layer without any modifications to applications software. In such an aspect, a tunnel may be dynamically established in the operator's network upon initial connectivity, and additional paths may be subsequently added or deleted, while the tunnel may persist when a path is added or deleted. In most mobile computing use-cases with quasi-static wireless connections, it is expected that the paths that get created during a session will continue to exist.

Figure 14:
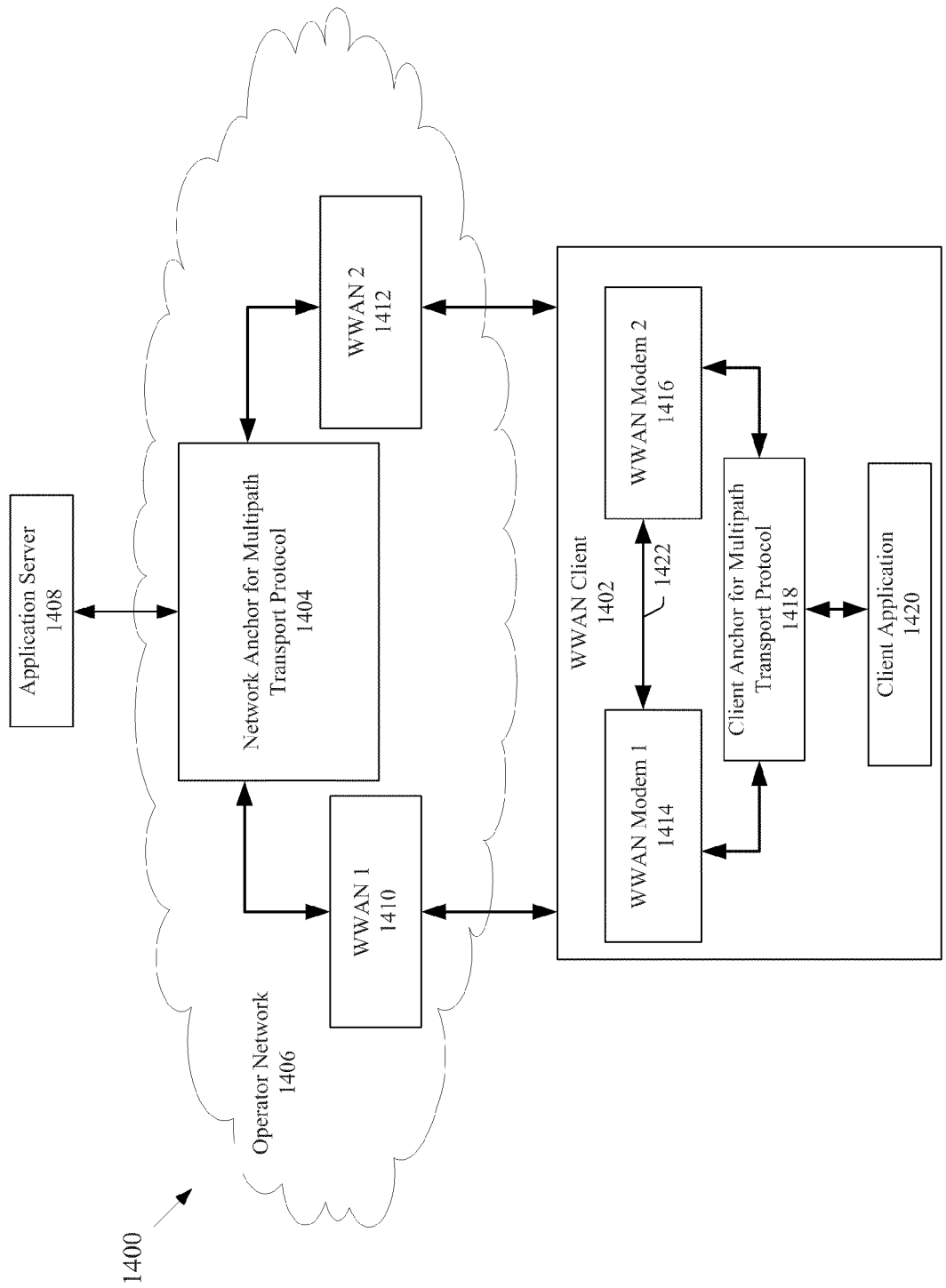
FIG. 14 is another block diagram illustrating a Multipath Transport tunneling service with inter-modem coordination.

FIG. 14 is a block diagram 1400 illustrating a tunneling service across WWAN carriers with inter-modem coordination. A network anchor for MPTP may assist in establishing a link between the client application 1420 of a WWAN client 1402 and an application server 1408 through one or more support infrastructures, e.g., WWAN Modems 1,2 (1414, 1416), WWANs (1410, 1412), Operator Network 1406, etc. In one aspect, the client application 1420 may communicate through a client anchor for MPTP 1418.

In one aspect, inter-modem coordination 1422 may be used to determine which WWANs (1410, 1412) may be used, and how those WWANs (1410, 1412) may be used. In one aspect, if WWAN modems (1414, 1416) are on the same platform, information between the modems may be exchanged through a processing subsystem on the platform (e.g., an ARM processing subsystem), so that the WWAN modems (1414, 1416) may coordinate and select WWANs (1410, 1412) to use. For example, if one WWAN modem 1414 selects a specific network, that WWAN modem 1414 may inform one or more other WWAN modems 1416 to select a different network, so that the performance from both networks can be aggregated in the system 1400. Also, in another aspect, based on constraints such as, but not limited to, link conditions, energy/bit associated with transmissions, available bandwidth, cost of utilization of a link, modulation and coding scheme being used, distance to a basestation, etc., the WWAN modems (1414, 1416) may choose when to cooperate with each other to aggregate bandwidth. Such constraint information can be exchanged between modems during inter-modem coordination, to allow decision making across the modems to select or utilize available WWANs for communication. In still another aspect, when connection conditions for an access link are poor, for example, when link conditions for one of the access links are poor, or the energy/bit is low, or if the available bandwidth is low, or if the cost of access is high, then that access link can be determined as not being desirable for aggregation. In such an aspect, the WWAN modems (1414, 1416) may jointly inform a MultiPath TCP layer in a network anchor for MPTP 1404 to not use such a path, but continue to use other paths. In one aspect, inter-modem coordination 1422 may be operable with another WWAN modem available over a wireless p2p link on a second device (e.g., connections 1116, 1216, etc.). In another aspect, primary cooperation may refer to coordination between WWAN modems (1414, 1416) on the same platform 1402 (e.g., within a phone, laptop, tablet, etc.), and Secondary coordination may refer the coordination across platforms (e.g., between one or more phones, laptops, tablets, car-modems, etc.).

Figure 15:
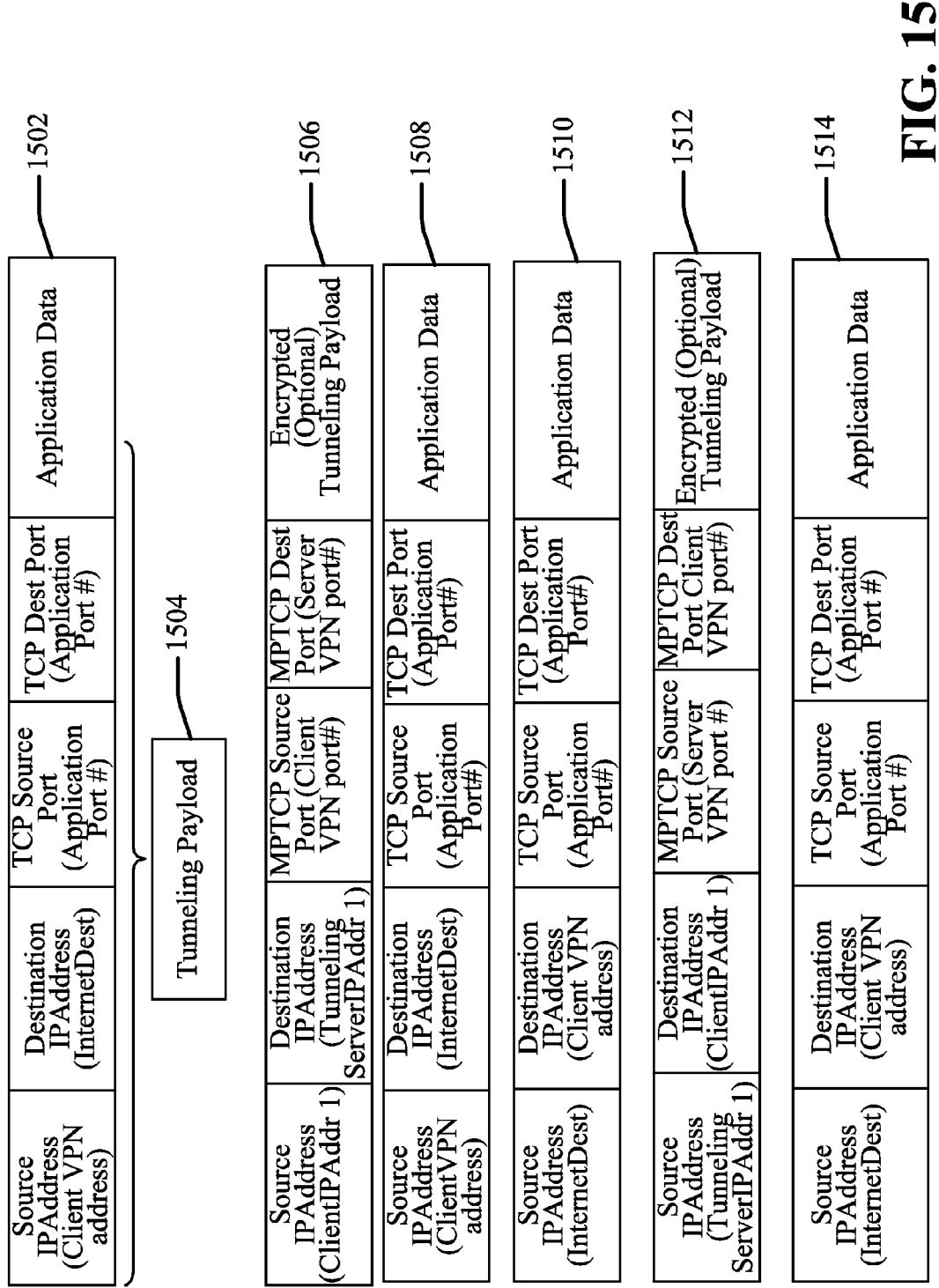
FIG. 15 is a block diagram illustrating example packet flows.

FIG. 15 is a block diagram illustrating various example packet formats and flows. In one aspect, packet formats 1502, 1506 and 1508 illustrate data flows from a client (e.g., 1302) to an Internet destination (e.g., 1308). Data format 1502 provides an example IP packet for application data at client. In one aspect, IP packet 1502 may be included in a tunneling payload 1504. Data format 1506 provides an example tunneling wrapper at a client. In the depicted aspect, one of the MPTCP sub-flows is used. Data format 1508 provides a format for receiving the packet at the MPTCP tunneling server.

In another aspect, packet formats 1510, 1512 and 1514 provide example packet formats for communications from an internet server to the client. Data packet 1510 provides an example data format at an internet server. Data packet 1512 provides an example format at a tunneling server. In the depicted aspect, one of the MPTCP sub-flows is used. Further, data packet 1514 provides an example format for a client to extract a tunneling payload, application data, etc.

Figure 16:
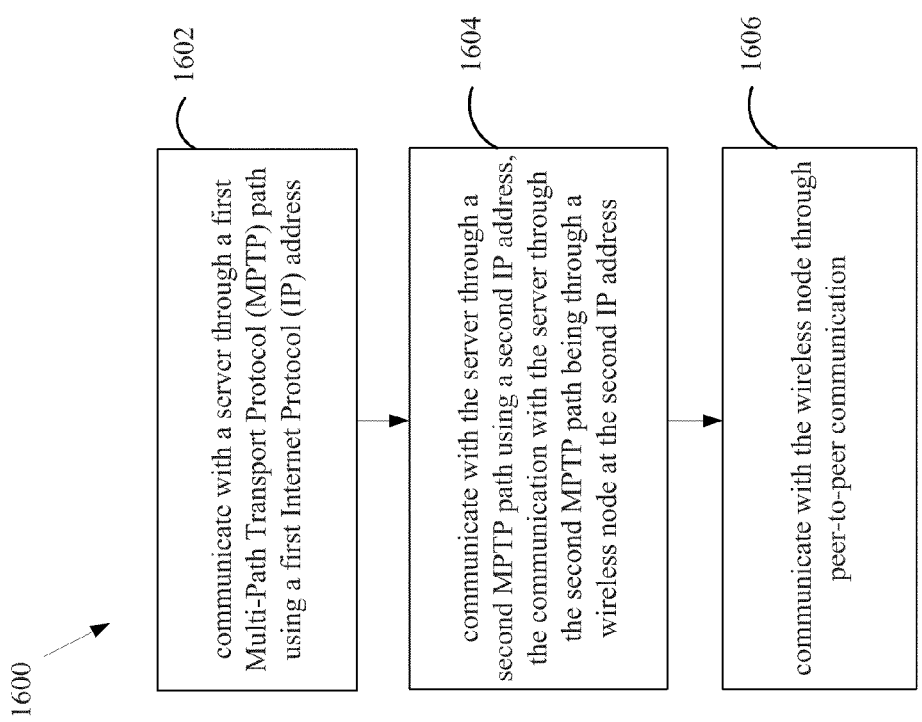
FIG. 16 is a flow chart of an exemplary method.

FIG. 16 is a flow chart 1600 of an exemplary method/process. Using the process, a device may communicate with a server through a first MPTP path using a first IP address (1602); communicate with the server through a second MPTP path using a second IP address, the communication with the server through the second MPTP path being through a wireless node at the second IP address (1604); and communicate with the wireless node through peer-to-peer communication (1606).

Figure 17:
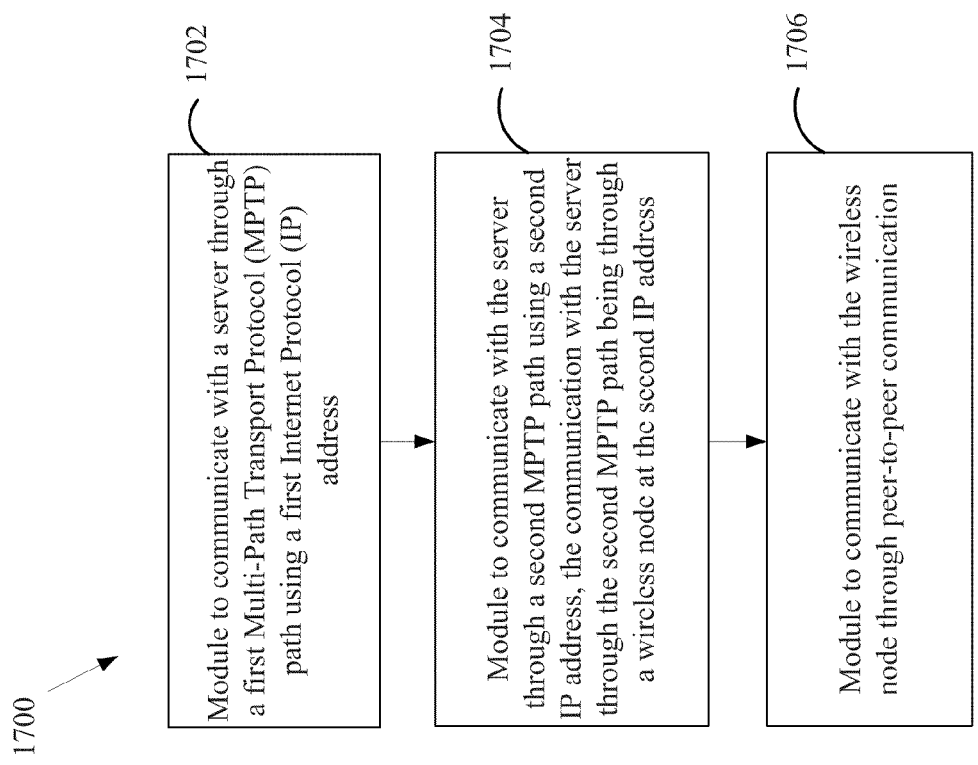
FIG. 17 is a conceptual block diagram illustrating the functionality of an exemplary apparatus.

FIG. 17 is a conceptual block diagram illustrating the functionality of an exemplary apparatus 1700. Referring to FIG. 17, a system 1700 which may include a UE, a WWAN client and any suitable number of additional WWAN clients or UEs. Further, in operation in the system 1700, the UE may implement bandwidth aggregation techniques.

The apparatus 1700 includes a module 1702 that may communicate with a server through a first MPTP path using a first IP address. The apparatus 1700 includes a module 1704 that may communicate with the server through a second MPTP path using a second IP address, the communication with the server through the second MPTP path being through a wireless node at the second IP address. The apparatus 1700 includes a module 1706 that may communicate with the wireless node through peer-to-peer communication.

Figure 18:
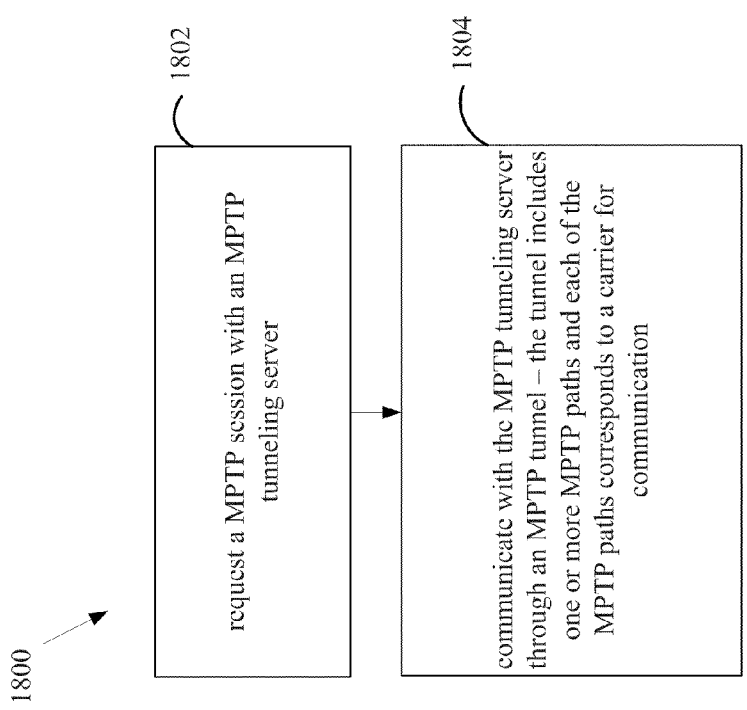
FIG. 18 is a flow chart of another exemplary method.

FIG. 18 is a flow chart 1800 of an exemplary method/process. Using the process, a device requests an MPTP session with an MPTP tunneling server (1802). In addition, the process may allow device to communicate with the MPTP tunneling server through an MPTP tunnel (1804). The tunnel includes one or more MPTP paths. Each of the MPTP paths corresponds to a carrier for communication.

Figure 19:
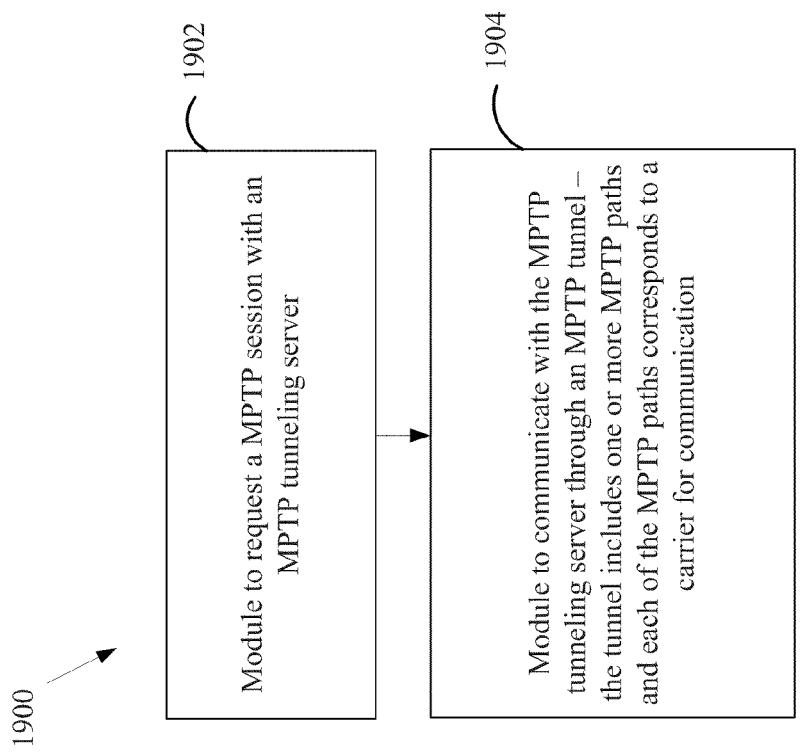
FIG. 19 is a conceptual block diagram illustrating the functionality of an exemplary apparatus.

FIG. 19 is another conceptual block diagram illustrating the functionality of an exemplary apparatus 1900. Referring to FIG. 19, a system 1900 which may include a UE, a WWAN client and any suitable number of additional WWAN clients or UEs. Further, in operation in the system 1900, the eNB may implement bandwidth aggregation techniques.

The apparatus 1900 includes a module 1902 that may request an MPTP session with an MPTP tunneling server.

The apparatus 1900 includes a module 1904 that may communicate with the MPTP tunneling server through an MPTP tunnel.

Figure 20:
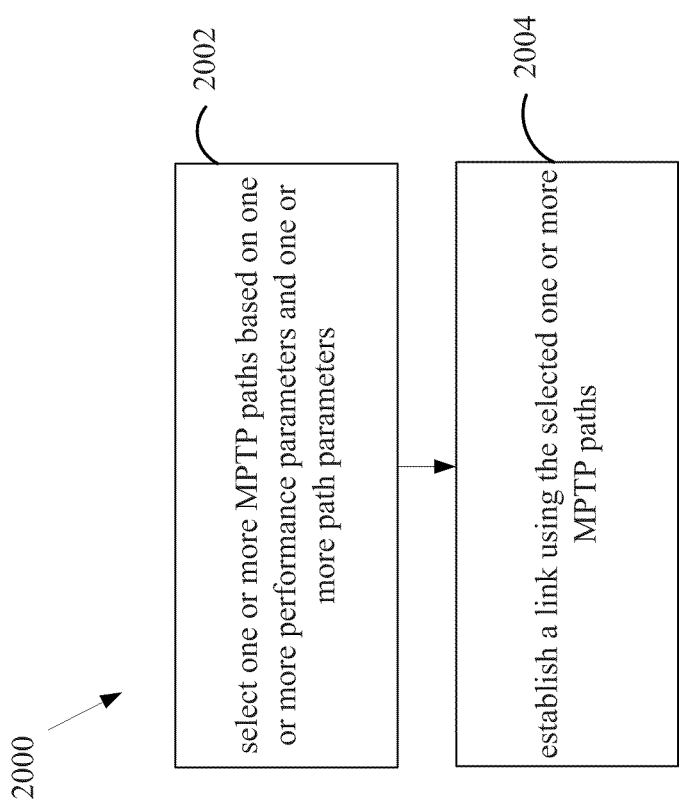
FIG. 20 is a flow chart of still another exemplary method.

FIG. 20 is a flow chart 2000 of an exemplary method/process. Using the process, a device selects one or more MPTP paths based on one or more performance parameters and one or more path parameters (2002). In addition, the process may allow device to establish a link using the selected one or more MPTP paths (2004). Each of the MPTP paths may correspond to a carrier for communication.

Figure 21:
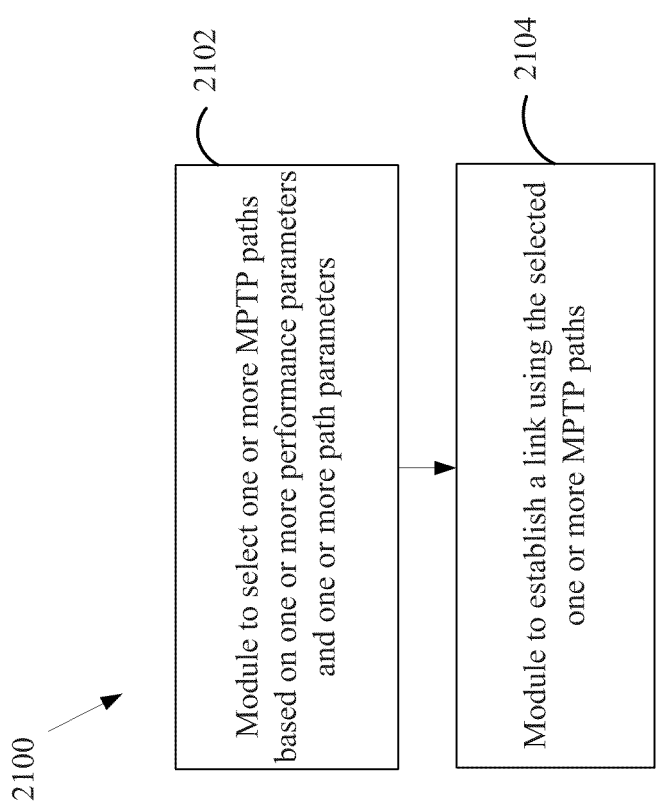
FIG. 21 is a conceptual block diagram illustrating the functionality of an exemplary apparatus.

FIG. 21 is another conceptual block diagram illustrating the functionality of an exemplary apparatus 2100. Referring to FIG. 21, a system 2100 which may include a UE anchor, a WWAN network anchor, etc. The apparatus 2100 includes a module 2102 that may select one or more MPTP paths based on one or more performance parameters and one or more path parameters. The apparatus 2100 includes a module 2104 that may establish a link using the selected one or more MPTP paths.

In one configuration, an apparatus 100 includes means for communicating with a server through a first MPTP path using a first IP address, means for communicating with the server through a second MPTP path using a second IP address, the communication with the server through the second MPTP path being through a wireless node at the second IP address, and means for communicating with the wireless node through peer-to-peer communication. In one configuration, apparatus 100 may include means for communicating with one or more user devices, wherein the one or more user devices access the MPTP tunneling server through the MPTP tunnel. In one configuration, apparatus 100 may include means for communicating with an application server through the MPTP tunneling server via the MPTP tunnel. In one configuration, apparatus 100 may include means for adding a new MPTP when the new MPTP path becomes available, or means for optimizing a distribution of the communication on the paths with the server based on the analyzed performance. In one configuration, apparatus 100 may include means for adding a new MPTP when the new MPTP path becomes available, or means for deleting an existing MPTP path when the MPTP path is lost.

In another configuration, an apparatus 100 includes means for requesting an MPTP session with an MPTP tunneling server and means for communicating with the MPTP tunneling server through an MPTP tunnel. The tunnel includes one or more MPTP paths. Each of the MPTP paths corresponds to a carrier for communication. In one configuration, apparatus 100 may include means for communicating with one or more user devices, wherein the one or more user devices access the MPTP tunneling server through the MPTP tunnel. In one configuration, apparatus 100 may include means for communicating with an application server through the MPTP tunneling server via the MPTP tunnel. In one configuration, apparatus 100 may include means for adding a new MPTP when the new MPTP path becomes available, or means for deleting an existing MPTP path when the MPTP path is lost. In one configuration, apparatus 100 may include means for obtaining a client IP address and a server IP address for each of the MPTP paths of communication with the MPTP tunneling server. In one configuration, apparatus 100 may include means for analyzing a performance of each of the paths, or means for optimizing a distribution of the communication on the paths with the MPTP tunneling server based on the analyzed performance. In one configuration, apparatus 100 may include means for communicating information with the MPTP tunneling server through the first MPTP subflow using a first IP address, means for communicating information with the MPTP tunneling server through the second MPTP subflow using a second IP address, the communication with the MPTP tunneling server through the second MPTP subflow being through a wireless node at the second IP address, and means for communicating with the wireless node through peer-to-peer communication. In one configuration, apparatus 100 may include means for receiving a VPN address.

In another configuration, an apparatus 100 includes means for selecting one or more MPTP paths based on one or more performance parameters and one or more path parameters, and mean for establishing a link using the selected one or more MPTP paths. In one configuration, apparatus 100 may include means for applying MAIC for each of the selected one or more paths, and mean for establishing the link based on the applied MAIC. In one configuration, apparatus 100 may include means for determining to not use a path to reduce network congestion associated with the non-used path. In one configuration, apparatus 100 may include means for using a first of the one or more paths for a first direction of communication. In one configuration, apparatus 100 may include means for using a second of the one or more paths for a second direction of communication. In one configuration, apparatus 100 may include means for refining the link using a one-way delay estimate based on round trip time information for each path. In one configuration, apparatus 100 may include means for transmitting a first packet over the established link, wherein the means for transmitting further comprising means for transmitting the first packet earlier than a scheduled time over a first of the one or more path. In one configuration, apparatus 100 may include means for transmitting a second packet over the established link, wherein the means for transmitting further comprising delaying means for transmitting the second packet past a scheduled time over a second of the one or more paths.

The aforementioned means is the processing system 110 configured to perform the function identified in each of the aforementioned means. Specifically, the aforementioned means in the processor 104 configured to perform the function identified in each of the aforementioned means.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   discovering, by a client device, that a proxy wireless node is within a proximity of the client device;

initiating, by the client device via a first path, a first transmission control protocol (TCP) session with a server using a first Internet Protocol (IP) address;

discovering, by the client device, that the server is MultiPath TCP capable;

requesting, by the client device, a second IP address from the proxy wireless node in response to the discovering that the server is MultiPath TCP capable;

receiving, by the client device, the second IP address from the proxy wireless node in response to the requesting, wherein the second IP address is obtained by the proxy wireless node from the server by sending a request to the server in response to receiving the request for the second IP address from the client device;

setting up a MultiPath TCP (MPTCP) session, by the client device, with the server using the first IP address and the second IP address, wherein setting up the MultiPath TCP session includes establishing a second TCP session with the server through the proxy wireless node via a second path using the second IP address and the initiation of the first TCP session with the server using the first IP address, and wherein the second TCP session is a peer-to-peer communication link with the proxy wireless node using the second IP address, and the first path corresponds to a first subflow and the second path corresponds to a second subflow;

communicating information, by the client device, with the server through the first subflow using the first IP address;

communicating information, by the client device, with the server through the second subflow using the second IP address;

sending, by the client device, a first communication in the MultiPath TCP session to the server through the first path;

receiving, by the client device, a second communication in the MultiPath TCP session from the server at the first IP address through the first path;

sending, by the client device, a third communication in the MultiPath TCP session to the server through the second path, the third communication being sent to the proxy wireless node through the peer-to-peer communication and sent by the proxy wireless node to the server; and receiving, by the client device, a fourth communication in the MultiPath TCP session from the server through the second path, the fourth communication being sent from the server to the second IP address of the proxy wireless node, received by the proxy wireless node at the second IP address, and sent by the proxy wireless node through the peer-to-peer communication.

2. The method of claim 1, wherein the peer-to-peer communication link comprises a wired or a wireless link.

3. The method of claim 1, further comprising:
analyzing at least one of a performance or a cost of each of the paths; and
optimizing a distribution of the communications on the paths with the server based on the analyzed performance or cost.

4. The method of claim 3, wherein at least one overlay is used to exchange performance information with the server.

5. The method of claim 1, further comprising at least one of:
adding a new path when the new path-becomes available; or deleting an existing path when the existing path is lost.

6. The method of claim 5, wherein the addition or deletion of a path is based on a network availability, a proxy node availability, or on a performance of the path.

7. The method of claim 1, further comprising:
communicating with the server through two or more modems associated with a communication device over wired or wireless links.

8. The method of claim 7, wherein communicating through the two or more modems further comprises using inter-modem coordination to exchange at least one of a performance information, pricing information, or availability information regarding one or more wireless wide area networks (WWANs) or to select one or more WWANs.

9. An apparatus for wireless communication, comprising:
means for discovering, by a client device, that a proxy wireless node is within a proximity of the client device;
means for initiating, by the client device via a first path, a first transmission control protocol (TCP) session with a server using a first Internet Protocol (IP) address;
means for discovering, by the client device, that the server is MultiPath TCP capable;
means for requesting, by the client device, a second IP address from the proxy wireless node in response to the discovering that the server is MultiPath TCP capable;
means for receiving, by the client device, the second IP address from the proxy wireless node in response to the requesting, wherein the second IP address is obtained by the proxy wireless node from the server by sending a request to the server in response to receiving the request for the second IP address from the client device;
means for setting up a MultiPath TCP (MPTCP) session, by the client device, with the server using the first IP address and the second IP address,
wherein setting up the MultiPath TCP session includes establishing a second TCP session with the server through the proxy wireless node via a second path using the second IP address and the initiation of the first TCP session with the server using the first IP address, and
wherein the second TCP session is a peer-to-peer communication link with the proxy wireless node using the second IP address, and the first path corresponds to a first subflow and the second path corresponds to a second subflow;
means for communicating, by the client device, information with the server through the first subflow using the first IP address;
means for communicating, by the client device, information with the server through the second subflow using the second IP address;
means for sending, by the client device, a first communication in the MultiPath TCP session to the server through the first path;
means for receiving, by the client device, a second communication in the Multi Path TCP session from the server at the first IP address through the first path;
means for sending, by the client device, a third communication in the MultiPath TCP session to the server through the second path, the third communication being sent to the proxy wireless node through the peer-to-peer communication and sent by the proxy wireless node to the server; and
means for receiving, by the client device, a fourth communication in the MultiPath TCP session from the server through the second path, the fourth communication being sent from the server to the second IP address of the proxy wireless node, received by the proxy wireless node at the second IP address, and sent by the proxy wireless node through the peer-to-peer communication.

10. The apparatus of claim 9, wherein the peer-to-peer communication link comprises a wired or a wireless link.

11. The apparatus of claim 9, further comprising:
means for analyzing at least one of a performance or a cost of each of the paths; and
means for optimizing a distribution of the communications on the paths with the server based on the analyzed performance or cost.

12. The apparatus of claim 11, wherein at least one overlay is used to exchange performance information with the server.

13. The apparatus of claim 9, further comprising at least one of:
means for adding a new path when the new path-becomes available; or
means for deleting an existing path when the existing path is lost.

14. The apparatus of claim 13, wherein the addition or deletion of a path is based on a network availability, a proxy node availability, or on a performance of the path.

15. The apparatus of claim 9, further comprising:
means for communicating with the server through two or more modems available to a communication device over wired or wireless links.

16. The apparatus of claim 15, wherein means for communicating through the two or more modems further comprises means for using inter-modem coordination to exchange at least one of a performance information, pricing information, or availability information regarding one or more wireless wide area networks (WWANs) or to select one or more WWANs.

17. A non-transitory computer-readable medium storing computer executable code for wireless communication, comprising:
code for discovering, by a client device, that a proxy wireless node is within a proximity of the client device;
code for initiating, by the client device via a first path, a first transmission control protocol (TCP) session with a server using a first Internet Protocol (IP) address;
code for discovering, by the client device, that the server is MultiPath TCP capable;
code for requesting, by the client device, a second IP address from the proxy wireless node in response to the discovering that the server is MultiPath TCP capable;
code for receiving, by the client device, the second IP address from the proxy wireless node in response to the requesting, wherein the second IP address is obtained by the proxy wireless node from the server by sending a request to the server in response to receiving the request for the second IP address from the client device;
code for setting up a MultiPath TCP (MPTCP) session, by the client device, with the server using the first IP address and the second IP address,
wherein setting up the MultiPath TCP session includes establishing a second TCP session with the proxy wireless node via a second path using the second IP address and the initiation of the first TCP session with the server using the first IP address, and
wherein the second TCP session is a peer-to-peer communication link with the proxy wireless node using the second IP address, and the first path corresponds to a first subflow and the second path corresponds to a second subflow;

code for communicating, by the client device, information with the server through the first subflow using the first IP address;
code for communicating, by the client device, information with the server through the second subflow using the second IP address;
code for sending, by the client device, a first communication in the MultiPath TCP session to the server through the first path;
code for receiving, by the client device, a second communication in the MultiPath TCP session from the server at the first IP address through the first path;
code for sending, by the client device, a third communication in the MultiPath TCP session to the server through the second path, the third communication being sent to the proxy wireless node through the peer-to-peer communication and sent by the proxy wireless node to the server; and
code for receiving, by the client device, a fourth communication in the MultiPath TCP session from the server through the second path, the fourth communication being sent from the server to the second IP address of the proxy wireless node, received by the proxy wireless node at the second IP address, and sent by the proxy wireless node through the peer-to-peer communication.

18. An apparatus for wireless communication, comprising:
a transceiver;
one or more modems; and
a processing system operably coupled to the transceiver and the one or more modems, the processor, the transceiver, and the one or more modems configured to
discover, by a client device, that a proxy wireless node is within a proximity of the client device;
initiate, by the client device via a first path, a first transmission control protocol (TCP) session with a server using a first Internet Protocol (IP) address;
discover, by the client device, that the server is MultiPath TCP capable;
request, by the client device, a second IP address from the proxy wireless node in response to the discovering that the server is MultiPath TCP capable;
receive, by the client device, the second IP address from the proxy wireless node in response to the requesting, wherein the second IP address is obtained by the proxy wireless node from the server by sending a request to the server in response to receiving the request for the second IP address from the client device;
set up a MultiPath TCP (MPTCP) session, by the client device, with the server using the first IP address and the second IP address,
wherein setting up the MultiPath TCP session includes establishing a second TCP session with the proxy wireless node via a second path using the second IP address and the initiation of the first TCP session with the server using the first IP address, and
wherein the second TCP session is a peer-to-peer communication link with the proxy wireless node using the second IP address and the first path corresponds to a first subflow and the second path corresponds to a second subflow;
communicate, by the client device, information with the server through the first subflow using the first IP address;

communicate, by the client device, information with the server through the second subflow using the second IP address;

send, by the client device, a first communication in the MultiPath TCP session to the server through the first path;

receive, by the client device, a second communication in the MultiPath TCP session from the server at the first IP address through the first path;

send, by the client device, a third communication in the MultiPath TCP session to the server through the second path, the third communication being sent to the proxy wireless node through the peer-to-peer communication and sent by the proxy wireless node to the server; and receive, by the client device, a fourth communication in the MultiPath TCP session from the server through the second path, the fourth communication being sent from the server to the second IP address of the proxy wireless node, received by the proxy wireless node at the second IP address, and sent by the proxy wireless node through the peer-to-peer communication.

19. The apparatus of claim 18, wherein the peer-to-peer communication link is a wired or a wireless link.

20. The apparatus of claim 18, wherein the processing system is further configured to:

analyze at least one of a performance or a cost of each of the paths; and optimize a distribution of the communications on the paths with the server based on the analyzed performance or cost.

21. The apparatus of claim 20, wherein at least one overlay is used to exchange performance information with the server.

22. The apparatus of claim 18, wherein the processing system is further configured to perform at least one of:

adding a new path when the new path becomes available; or deleting an existing path when the existing path is lost.

23. The apparatus of claim 22, wherein the addition or deletion of a path is based on a network availability, a proxy node availability, or on a performance of the path.

24. The apparatus of claim 18, wherein the processing system is further configured to communicate through two or more modems available to a communication device over wired or wireless links.

25. The apparatus of claim 24, wherein the processing system is further configured to use inter-modem coordination to exchange at least one of a performance information, pricing information, or availability information regarding one or more wireless wide area networks (WWANs) or to select one or more WWANs.

* * * * *